US006568646B2

(12) United States Patent
Wess et al.

(10) Patent No.: US 6,568,646 B2
(45) Date of Patent: May 27, 2003

(54) WHEELCHAIR SWIVEL PLATFORM

(75) Inventors: Dennis B. Wess, Port Matilda, PA (US); Henry E. Watson, State College, PA (US); Carmen Scialabba, Calverton, MD (US); James A. Liska, Bridgeville, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/810,294

(22) Filed: Mar. 16, 2001

(65) Prior Publication Data

US 2001/0032916 A1 Oct. 25, 2001

Related U.S. Application Data

(63) Continuation-in-part of application No. 09/413,130, filed on Oct. 6, 1999, now abandoned.
(60) Provisional application No. 60/136,497, filed on May 28, 1999.

(51) Int. Cl.[7] .............................................. A47B 49/00
(52) U.S. Cl. ..................... 248/349.1; 108/139; 384/609
(58) Field of Search ................................ 108/142, 104, 108/139, 35, 46; 248/131, 349.1, 415, 521, 678; 388/590, 609, 613, 618, 619, 615, 617, 621, 622; 297/240, 242

(56) References Cited

U.S. PATENT DOCUMENTS

| 271,054 | A | * | 1/1883 | Fowler | 108/139 |
|---|---|---|---|---|---|
| 1,177,596 | A | * | 4/1916 | Bock | 384/618 |
| 1,234,033 | A | * | 7/1917 | Iseman | 104/44 |
| 1,321,874 | A | * | 11/1919 | Zimmerman | 384/589 |
| 2,468,419 | A | * | 4/1949 | Weber | 384/592 |
| 2,779,642 | A | * | 1/1957 | Matthews | 248/349.1 |
| 3,455,531 | A | * | 7/1969 | Baker | 248/349.1 |
| 3,936,026 | A | * | 2/1976 | Hampel et al. | 174/70 R |
| 4,073,551 | A | * | 2/1978 | Sutowski | 384/501 |
| 4,117,627 | A | * | 10/1978 | Slingerland, Jr. | 108/103 |
| 4,753,173 | A | * | 6/1988 | James | 104/35 |
| 4,934,843 | A | * | 6/1990 | Nakanishi | 384/512 |
| 5,000,513 | A | * | 3/1991 | Schmidt | 108/139 |
| 5,381,569 | A | * | 1/1995 | Church | 108/139 |
| 5,507,044 | A | * | 4/1996 | Williamson et al. | 5/507.1 |
| 5,676,483 | A | * | 10/1997 | Koubek | 297/411.36 |
| 5,765,913 | A | * | 6/1998 | LaPointe et al. | 248/370 |
| 5,788,618 | A | * | 8/1998 | Joutras | 482/114 |
| 6,062,584 | A | * | 5/2000 | Sabol | 280/14.24 |
| 6,231,020 | B1 | * | 5/2001 | Willson | 248/349.1 |
| 6,244,426 | B1 | * | 6/2001 | Murano et al. | 198/784 |
| 6,328,267 | B1 | * | 12/2001 | Mori | 248/118 |

FOREIGN PATENT DOCUMENTS

| FR | 2383631 A | * | 10/1978 |
|---|---|---|---|
| JP | 10054361 A | * | 2/1998 |

* cited by examiner

Primary Examiner—Ramon O. Ramirez
Assistant Examiner—Jon Szumny
(74) Attorney, Agent, or Firm—John J. Elnitski, Jr.

(57) ABSTRACT

A wheelchair swivel platform that allows a standard, unmodified wheelchair or other non-swiveling chair and an occupant to swivel about an area of a workstation, in much the same way as a modem swivel office chair. The wheelchair swivel platform includes a top plate 16 and a bottom plate. The bottom plate serves as a base for the platform which lies on the floor to support the top plate 16. The top plate 16 swivels about the bottom plate while supporting the wheelchair. A rotation locking device prevents rotation of the platform during positioning of the wheelchair on and off the platform.

9 Claims, 24 Drawing Sheets

WHEELCHAIR SWIVEL PLATFORM

This application is a continuation-in-part application of U.S. Ser. No. 09/413,130 filed on Oct. 6, 1999 now abandoned, which claims the benefit of provisional application Ser. No 60/136,497, filed May 28, 1999.

BACKGROUND

In the past ten to twenty years, employment of people restricted to wheelchairs and the like has increased. One problem in the work place which has become apparent is the seemingly simple task of working at a desk or workstation while using a wheelchair. The wheelchair user becomes fatigued from the constant moving of the wheelchair in order to access different parts of the desk or workstation. The constant moving of the wheelchair by the user at a workstation is equated to the swivel action of an office chair, which most people take for granted. The fatigued of the user is from the fact that the user must rotate both large wheels of a standard wheelchair in opposite directions in order to rotate the wheelchair about a fixed point at the desk or workstation. The user becomes fatigued because the user is using both arms all day just to swivel about the desk or workstation. Currently, there is nothing on market to provide a wheelchair user with the ability to swivel about a workstation. What is needed is something quiet, light weight, easy to access and easy to operate.

It is an object of the present invention to provide a wheelchair user with an apparatus that allows the user to swivel about a workstation.

It is another object of the present invention to provide such an apparatus for a wheelchair user that is quiet, light weight, easy to access and easy to operate.

SUMMARY OF THE INVENTION

The present invention is a wheelchair swivel platform that allows a standard, unmodified wheelchair or other non-swiveling chair and an occupant to swivel about an area of a workstation, in much the same way as a modem swivel office chair. The wheelchair swivel platform includes a top plate and a bottom plate. The bottom plate serves as a base for the platform which lies on the floor to support the top plate. The top plate swivels about the bottom plate while supporting the wheelchair. A rotation locking device prevents rotation of the platform during positioning of the wheelchair on and off the platform. Two version are disclosed. The main differences in the two versions being the interaction between the top and bottom plates. The first version includes the bottom plate, a round hub, top and bottom tapered roller bearings, the top plate, locking cap, the rotation locking device and a main nut and main bolt. The second version includes the bottom plate, square hub, plastic balls, ball bearing turntable, top plate, locking assembly, rotation locking device, main bolt and top and bottom grooves for the plastic balls.

DETAILED DESCRIPTION

Figure 1:
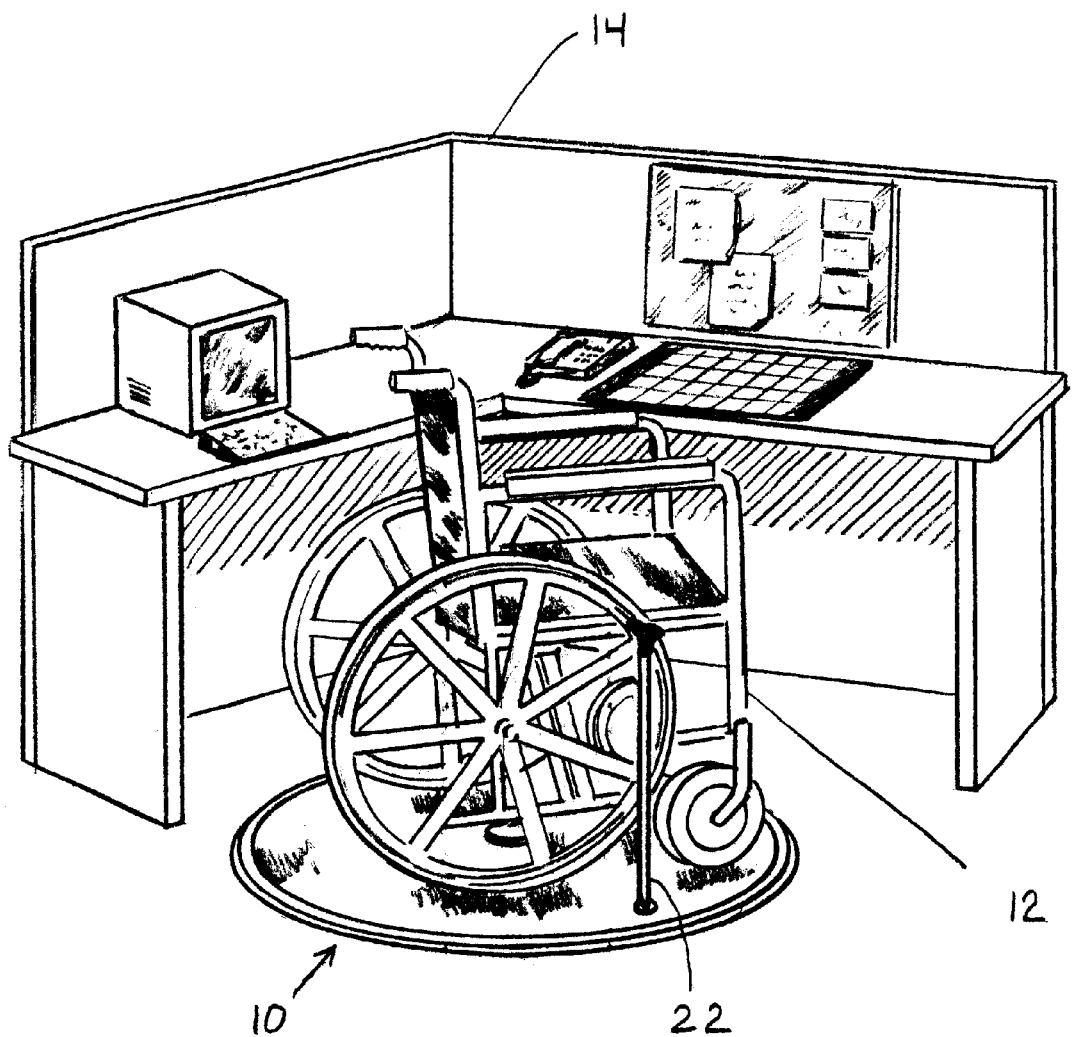
FIG. 1 is a perspective view of the wheelchair swivel platform at a workstation according to the present invention.
Figure 2:
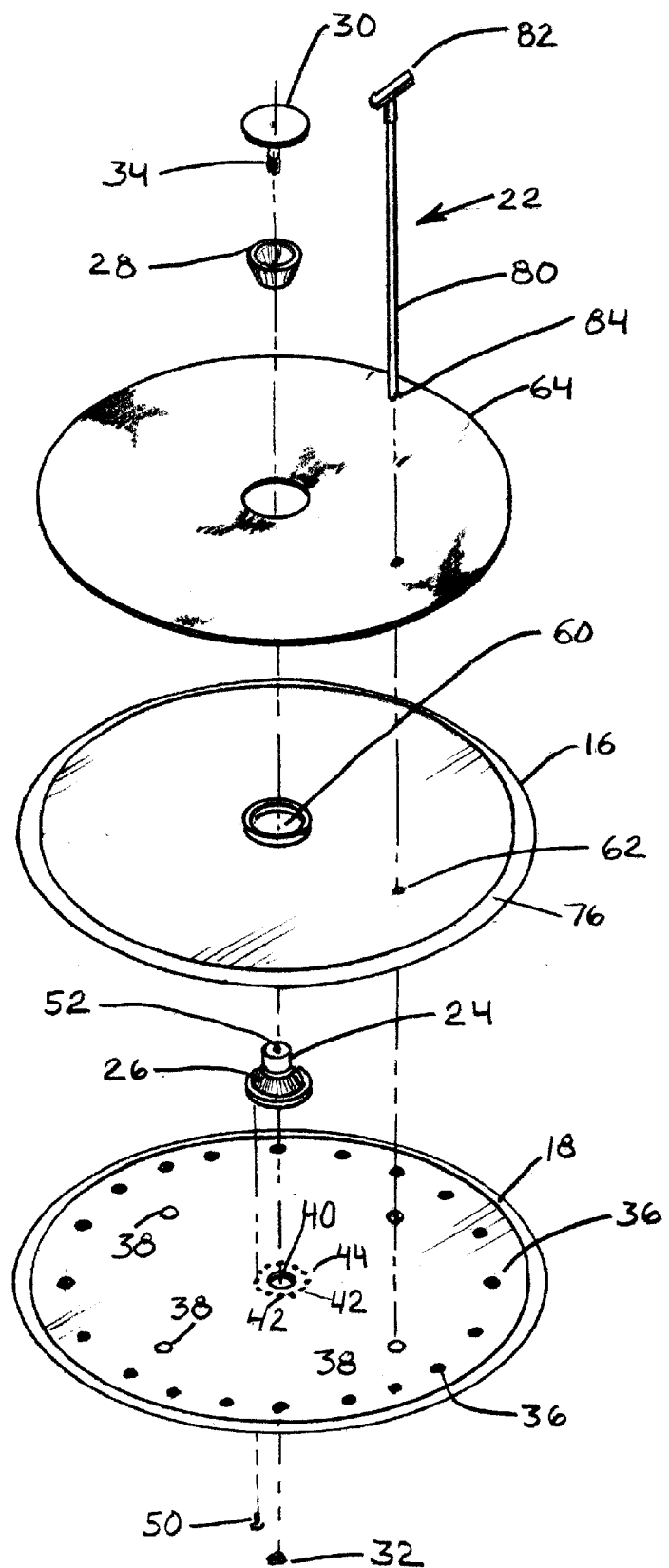
FIG. 2 is a exploded view of a first version of the wheelchair swivel platform according to the present invention.

The present invention is a wheelchair swivel platform that allows a standard, unmodified wheelchair and occupant to swivel about an area of a workstation, in much the same way as a modern swivel office chair. The wheelchair swivel platform 10 is shown in FIG. 1 with a wheelchair 12 at a workstation 14. As shown in FIGS. 2–13, the platform 10 includes a top plate 16 and a bottom plate 18, which are ideally made of aluminum. The bottom plate 18 serves as a base for the platform 10 which lies on the floor to support the top plate 16. The top plate 16 swivels about the bottom plate 18 while supporting the wheelchair 12. A rotation locking device 22 prevents rotation of the platform 10 during positioning of the wheelchair 12 on and off the platform 10. The rotation locking device 22 also acts as a safety aid when the platform is unoccupied in order to prevent unintended rotation of the top plate 16. FIGS. 2–7 show one version of the platform 10 and FIGS. 8–13 show a second version of the platform 10. The main differences in the two versions being the interaction between the top and bottom plates 16, 18.

The first version includes the bottom plate 18, a round hub 24, top and bottom tapered roller bearings 28, 26, the top plate 16, locking cap 30, the rotation locking device 22 and a main nut 32 and main bolt 34. The bottom plate 18 includes anti-friction pads 36, locking holes 38, a bottom plate center hole 40 and bolt holes 42 circling the center hole 40. The anti-friction pads 36 are fabric pads attached to the top of the bottom plate 18. The anti-friction pads 36 prevent metal to metal contact between the top and bottom plates 16, 18, when there is an overload of weight in any particular area of the top plate 16. The locking holes 38 are for receiving the locking device 22. The bottom plate center hole 40 has a top recessed section 44 on the top of the bottom plate 18, mid-section 46 and bottom recessed section 48 on the bottom plate 18. The top recessed section 44 receives the round hub 24. The mid-section 46 receives the main bolt 34 and the bottom recessed section 48 receives the nut 32. The bolt holes 42 receive bolts 50 to attach the round hub 24 to the bottom plate 18.

Figure 3:
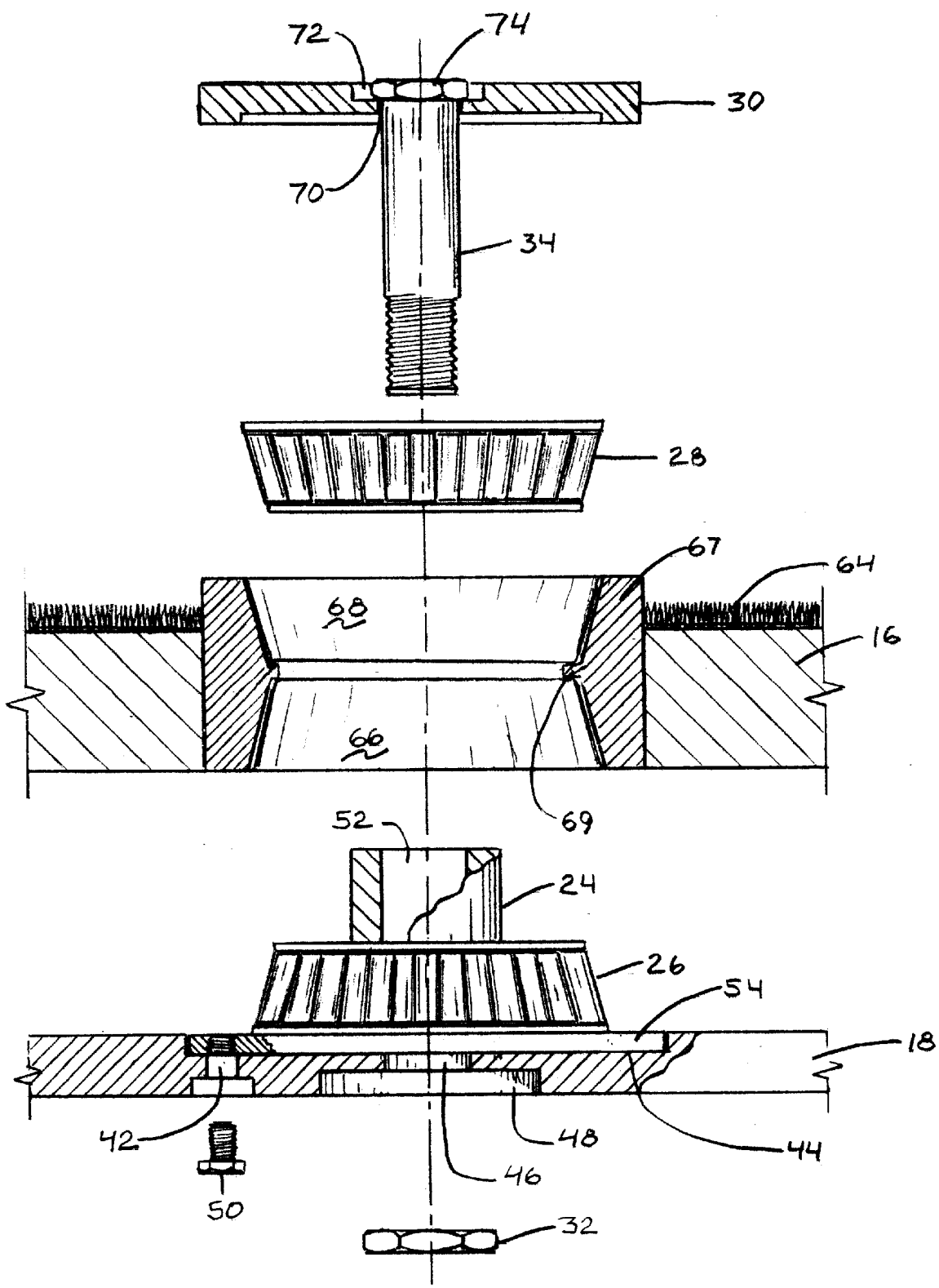
FIG. 3 is an exploded view of the bearing system of the first version of the wheelchair swivel platform according to the present invention.
Figure 4:
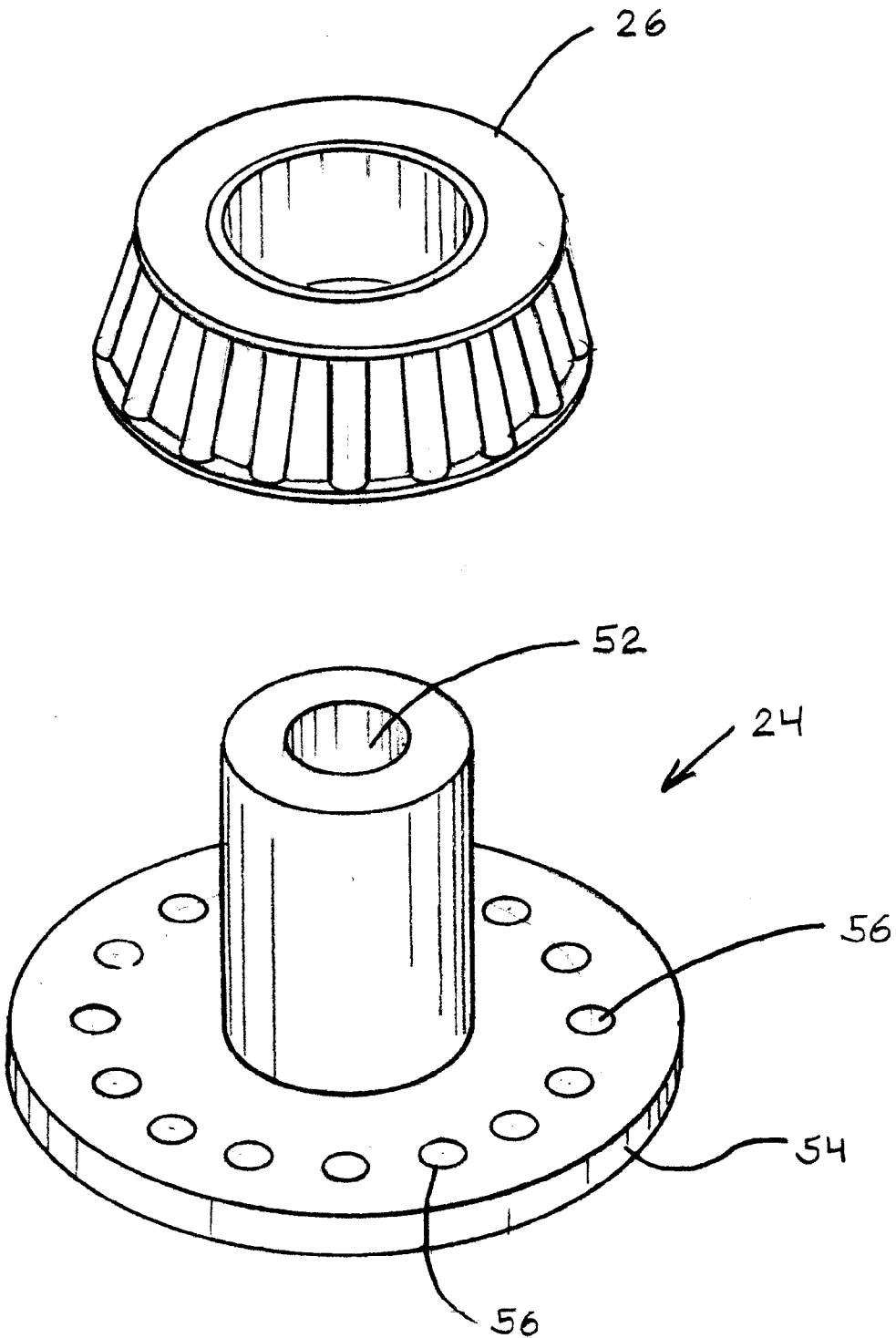
FIG. 4 is a perspective view of a bottom bearing and hub of the first version of the wheelchair swivel platform according to the present invention.
Figure 5:
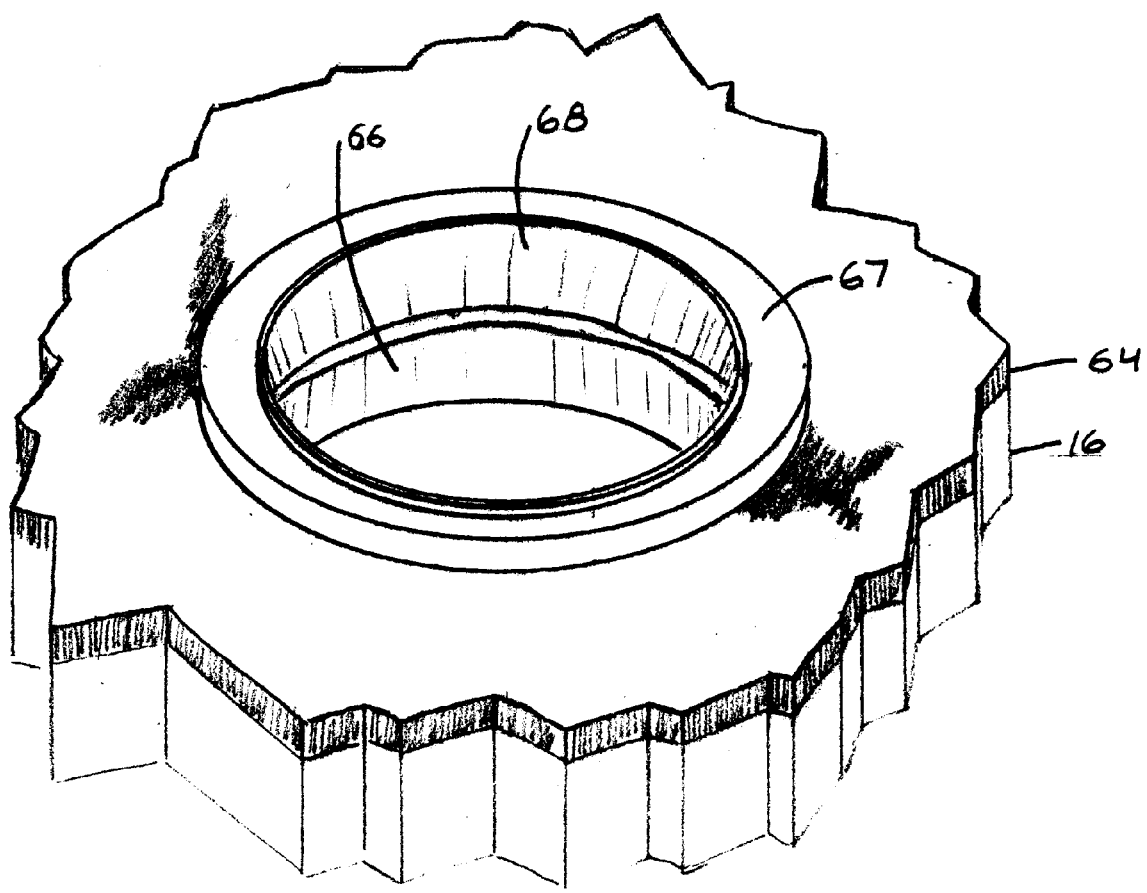
FIG. 5 is a perspective view of a top center hole of the first version of the wheelchair swivel platform according to the present invention.

The round hub 24 and two tapered roller bearings 26, 28 act as a main bearing assembly. The round hub 24 includes a hub center hole 52 and a flange 54 with threaded flange holes 56. The round hub 24 is attached to the bottom plate 18 by setting the flange 54 into the top recessed section 44. The bolts 50 are inserted from the bottom of the bottom plate 18 and screwed into the flange holes 56 to secure the round hub 24 to the bottom plate 18. When the round hub 24 is mounted to the bottom plate 18, the mid-section 46 of the bottom plate center hole 40 is aligned with the hub center hole 52. The round hub 24 extends upward from the bottom plate 18 to receive the top plate 16. Before placing the top plate 16 over the round hub 24, the bottom tapered bearing 26 is fitted over the round hub 24 as shown in FIG. 3. The bottom tapered bearing 26 supports the top plate 16 and allows the top plate 16 to swivel about the bottom plate 18.

Figure 6:
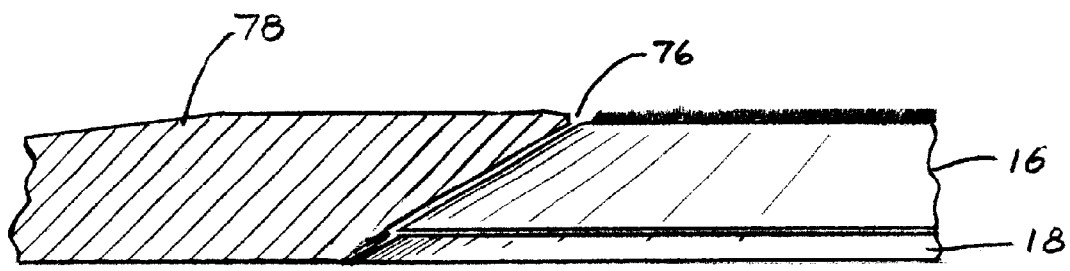
FIG. 6 is a side cross-sectional view of a ramp mounted next to the wheelchair swivel platform according to the present invention.
Figure 7:
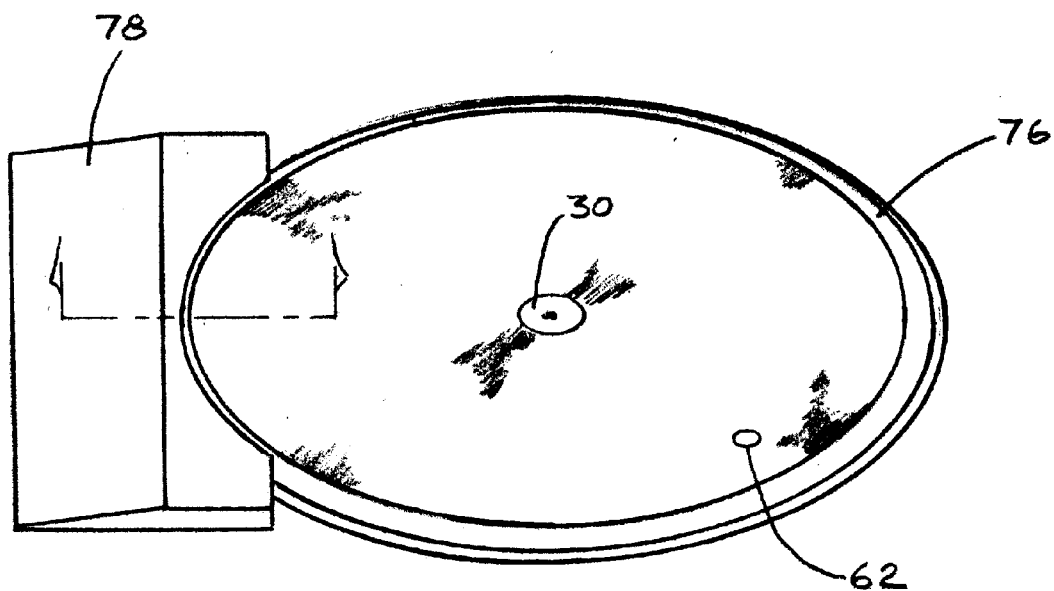
FIG. 7 is a perspective view of a ramp mounted next to the wheelchair swivel platform according to the present invention.
Figure 8:
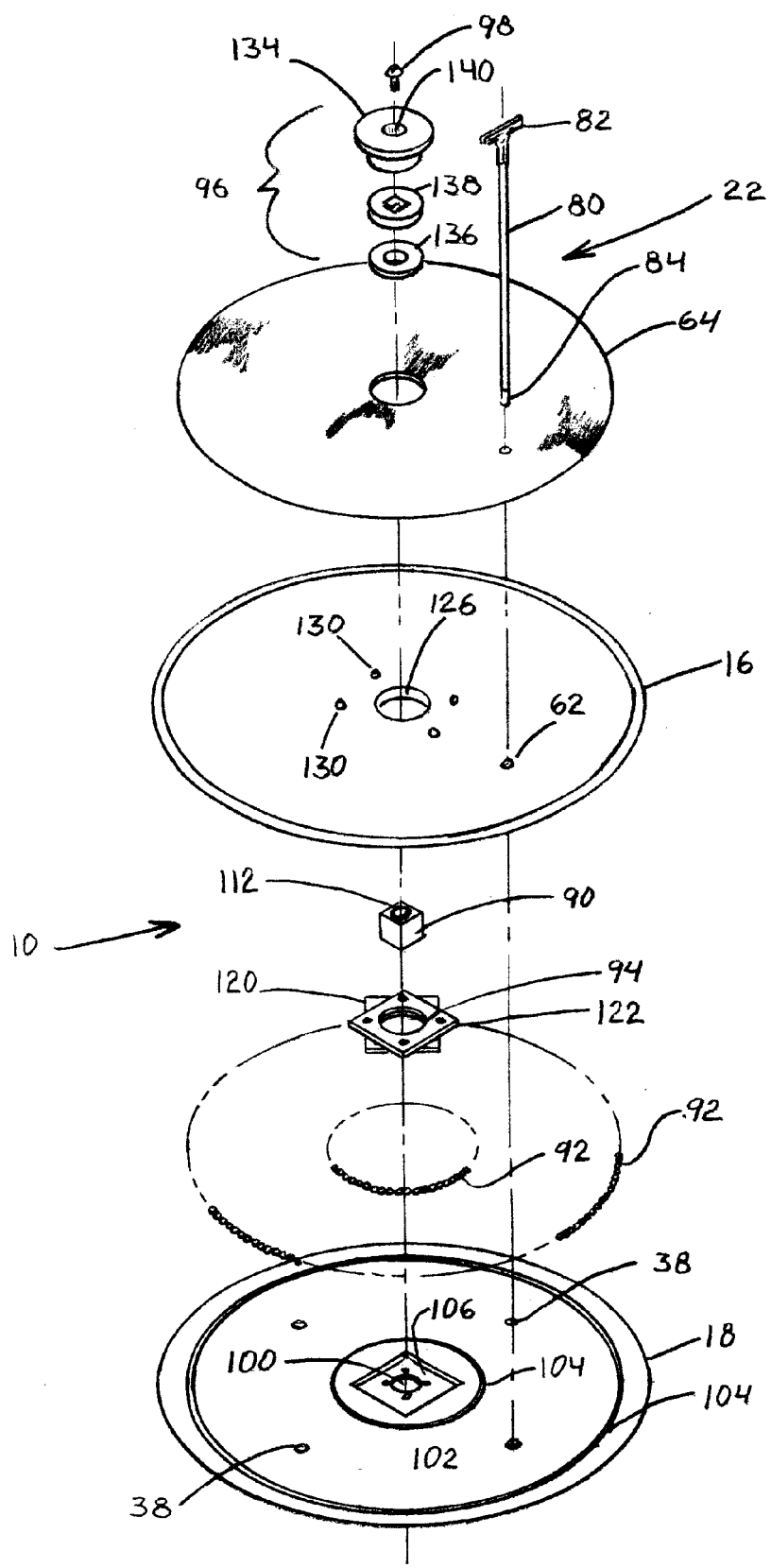
FIG. 8 is an exploded view of a second version of the wheelchair swivel platform according to the present invention.
Figure 9:
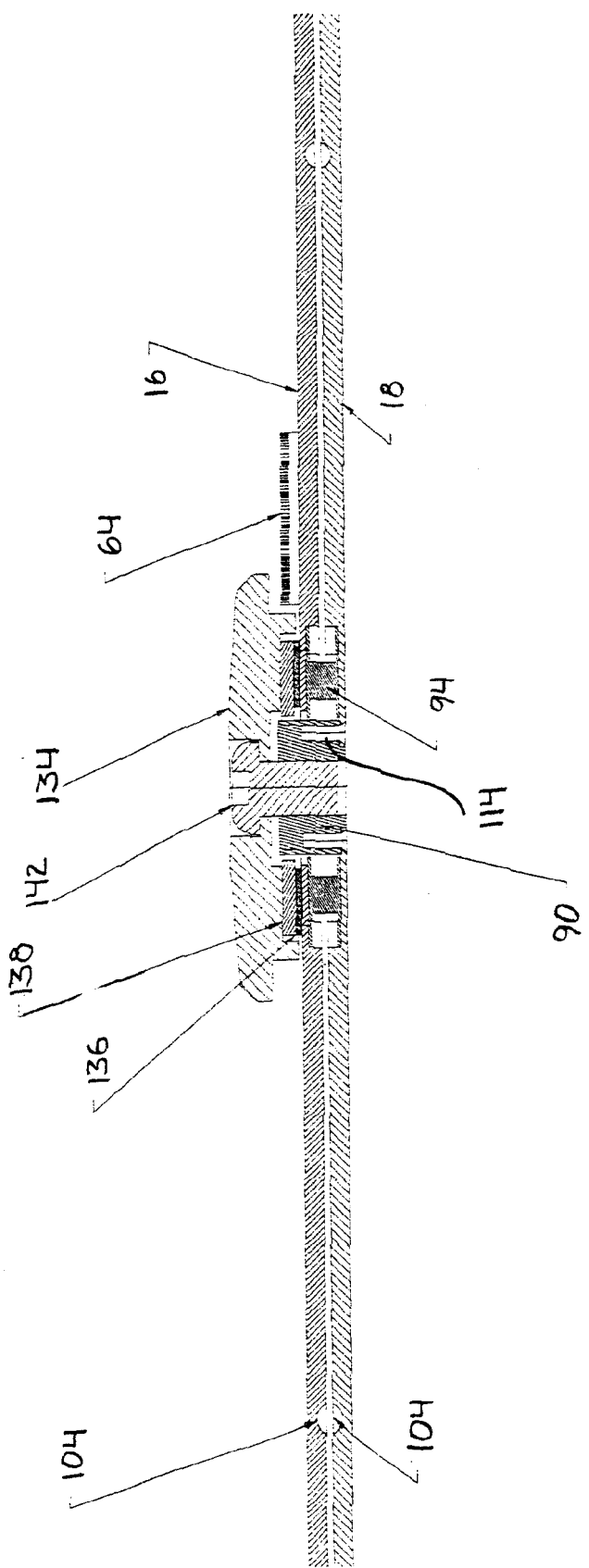
FIG. 9 is a cross-sectional view of a second version of the wheelchair swivel platform according to the present invention.
Figure 10:
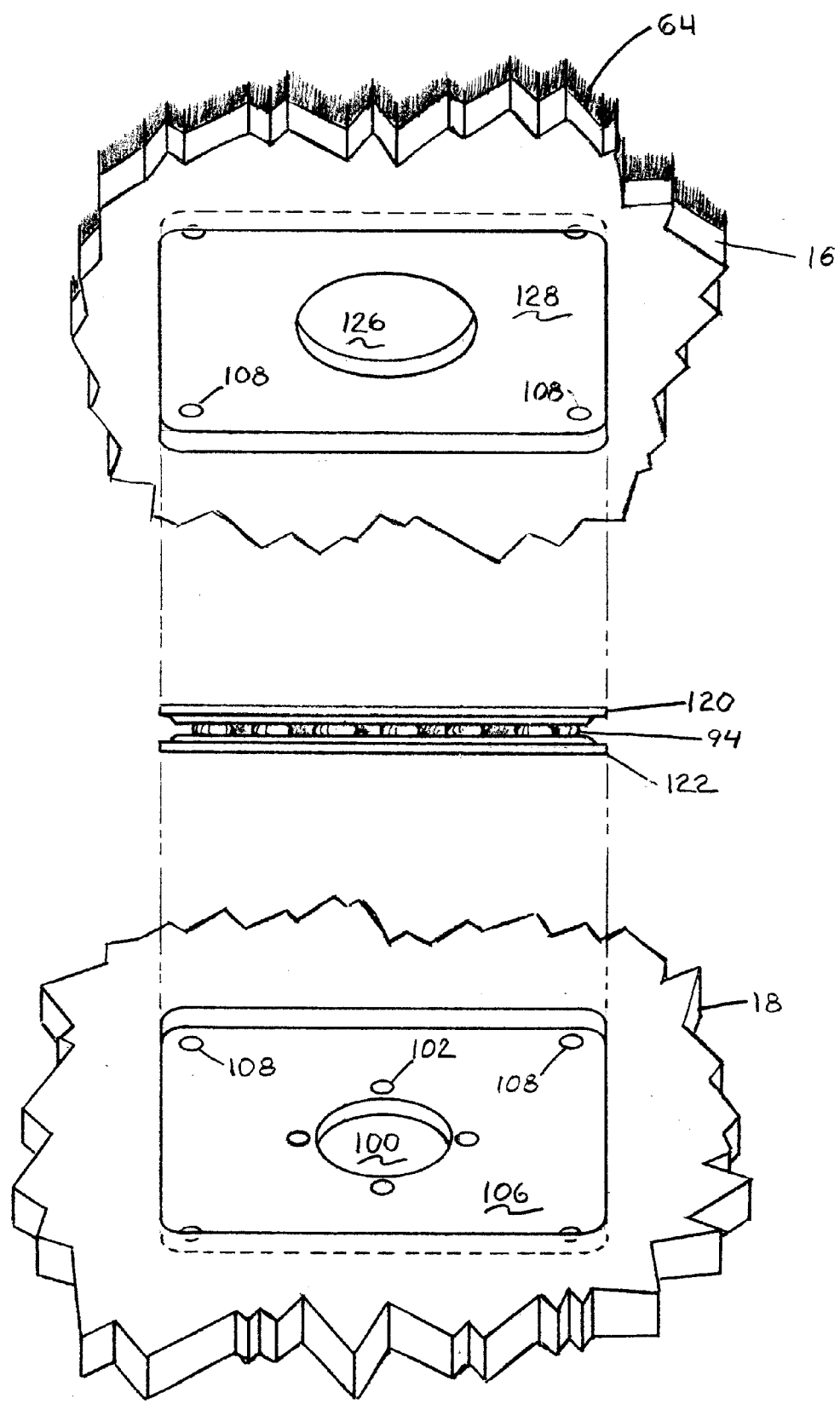
FIG. 10 is an exploded view of a turntable bearing and top and bottom plates of the second version of the wheelchair swivel platform according to the present invention.
Figure 11:
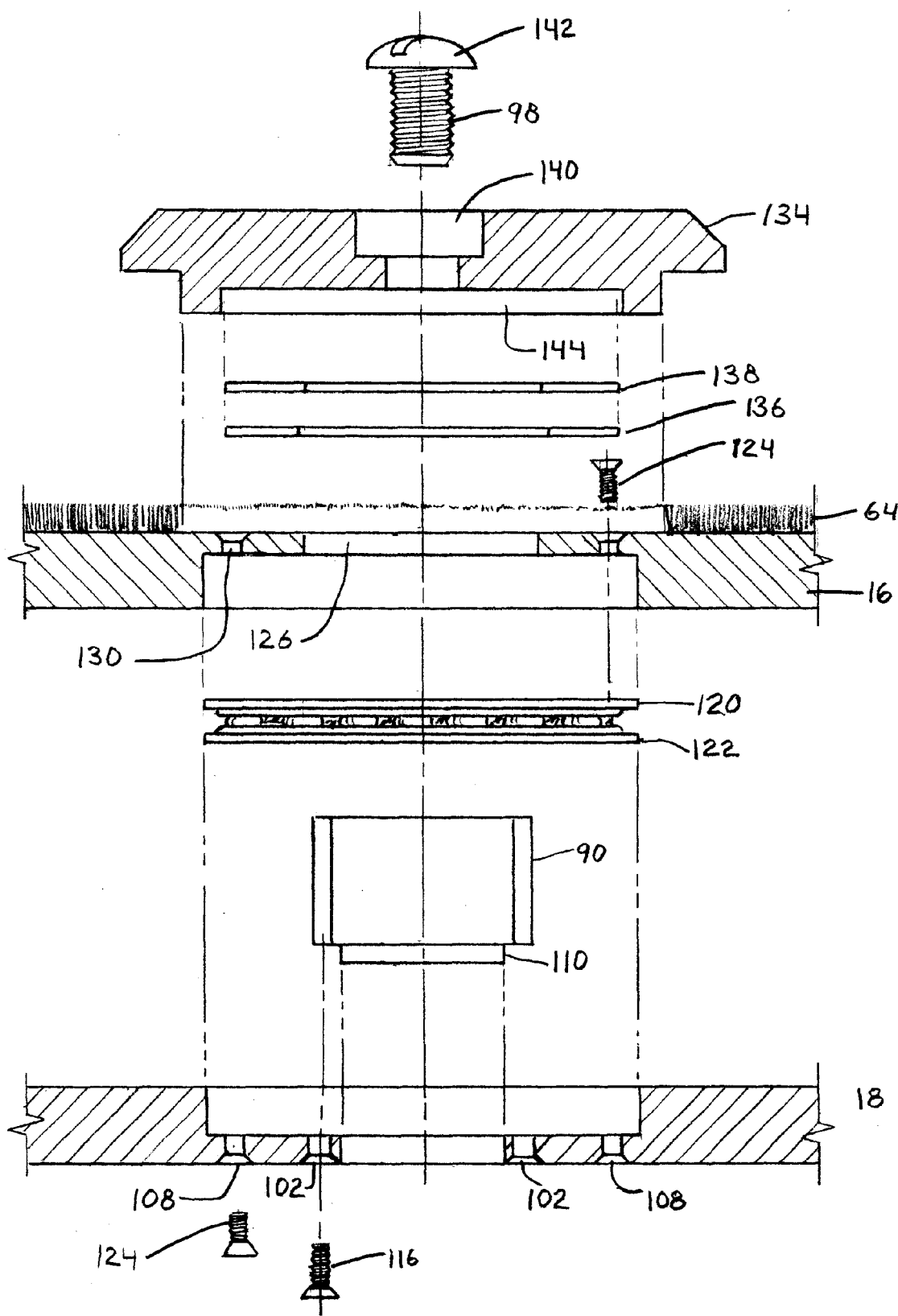
FIG. 11 is an exploded and cross-sectional view of a turntable bearing and top and bottom plates of the second version of the wheelchair swivel platform according to the present invention.
Figure 12:
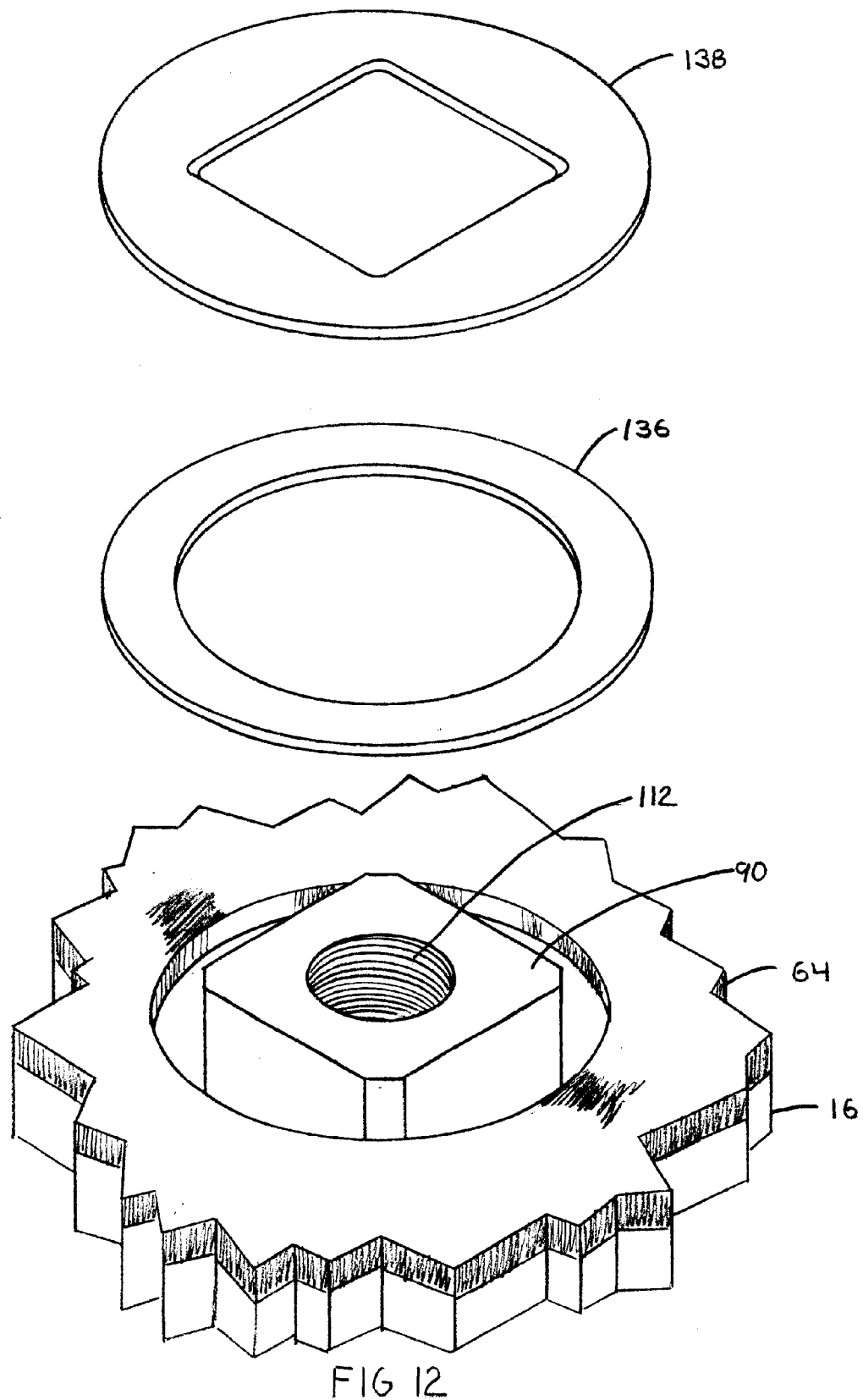
FIG. 12 is an exploded view of a top center hole of the second version of the wheelchair swivel platform according to the present invention.
Figure 13:
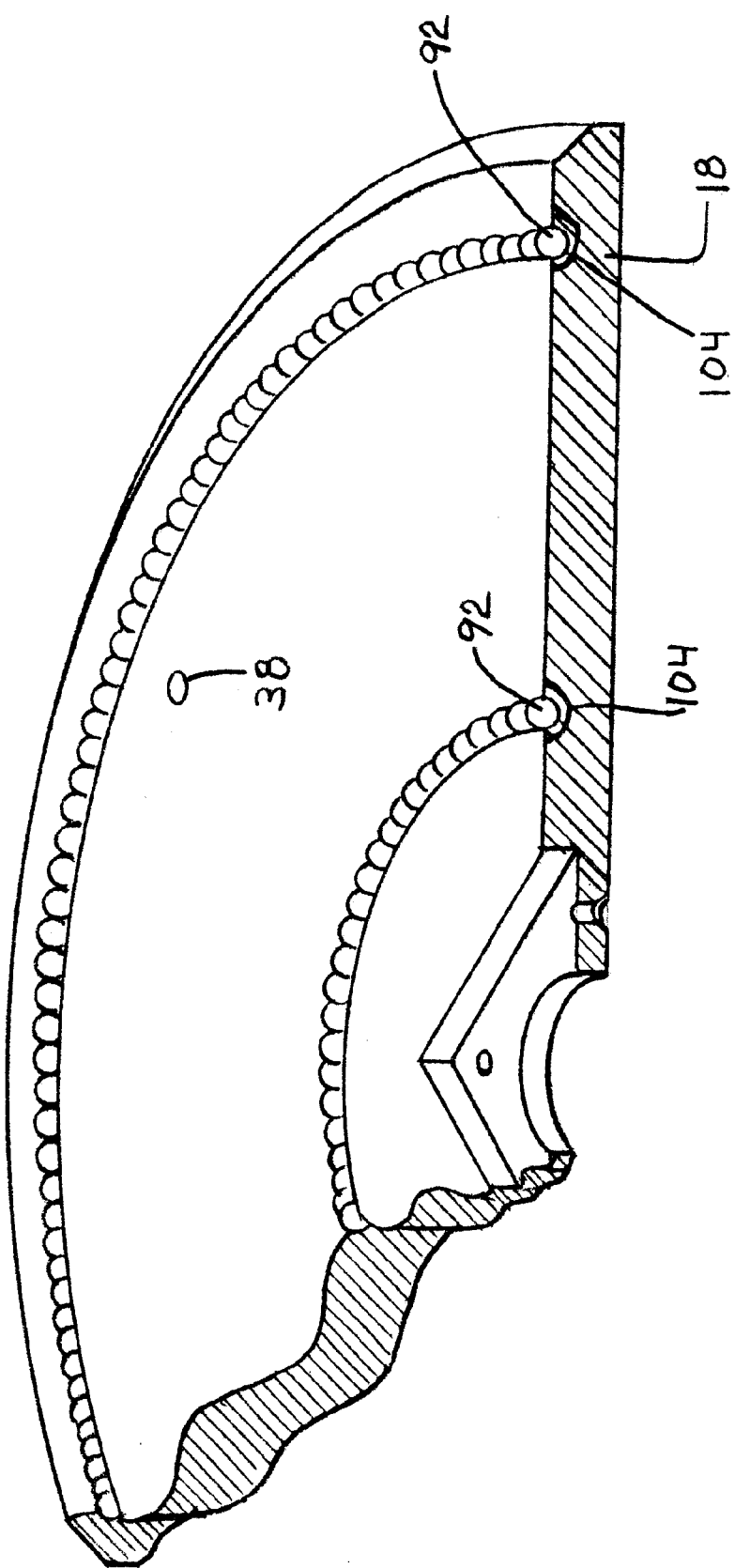
FIG. 13 is a perspective and cross-sectional view of the bottom plate of the second version of the wheelchair swivel platform according to the present invention.

The top plate 16 includes a top plate center hole 60, locking hole 62, flooring type surface 64, and top and bottom opposing races 68, 66. The top plate center hole 60 is for receiving the round hub 24 and includes a race holder 67 pressed into the top plate center hole 60. The race holder 67 includes a center ridge 69 to support and separate the top race 68 and bottom race 66. The top and bottom races 68, 66 are tapered and oppose each other. The top and bottom races 68, 66 are sized for receiving and supporting the tapered roller bearings 26, 28. When the top plate 16 is placed over the round hub 24 the bottom bearing 26 is fitted into the bottom race 66. Then, the top bearing 28 is placed into the top race 68. The locking cap 30 is placed over the top bearing 28 and includes a cap center hole 70. The main bolt 34 is placed through the locking cap 30, through the hub center hole 52 and through the bottom plate center hole 40. The main nut 32 is attached to the main bolt 34 in the bottom recess section 48. The locking cap 30 includes a cap recess section 72 to receive the head 74 of the main bolt 34. The flooring type surface 64 mounted onto the top plate 16 is shown as carpet, but could be any type of flooring surface. The top plate 16 also includes a tapered edge 76 to allow the wheelchair 12 to easily roll on and off the platform 10. In addition a ramp 78 as shown in FIG. 7 can be provided to ease rolling on and off the platform 10. The cross-section of the ramp 78 is shaped as shown in FIG. 6, such that the ramp 78 is near, but does not touch or interfere with the top plate 16.

The rotation locking device 22 is a rod 80 having a handle 82 at the top. The rod bottom 84 is place into the top plate locking hole 62 which is aligned with one of the bottom plate locking holes 38. The rod bottom 84 extends past the top plate locking hole 62 and into one of the aligned bottom plate locking holes 38 which prevents rotation of the top plate 16. Locking the top plate 16 in place, allows the user to move the wheelchair 12 on and off the top plate 16 and locks down the top plate 16 for safety. Removing the rod bottom 84 from the top and bottom locking holes 62, 38 allows the rotation of the top plate 16.

The second version includes the bottom plate 18, square hub 90, plastic balls 92, ball bearing turntable 94, top plate 16, locking assembly 96, rotation locking device 22 and main bolt 98. The bottom plate 18 includes locking holes 38, a bottom plate center hole 100, bolt holes 102 about the center hole 100 and two concentric rings of semicircular shaped grooves 104 cut directly into the bottom plate 18. The bottom plate center hole 100 includes a bottom squared out recess 106 on a top of the bottom plate 18. The bottom squared out recess 106 includes four bolt holes 108. The plastic balls 92 ride in the grooves 104 to act as ball bearings between the top and bottom plates 16, 18. The square hub 90 includes a round bottom 110 which fits into the bottom plate center hole 100. The round bottom 110 allows for easy alignment of the square hub 90 in the center of the bottom plate 18. The square hub 90 includes a hub center hole 112 that is threaded to receive the main bolt 98. The square hub 90 also includes threaded holes 114 in the bottom of the square hub 90. When the square hub 90 is placed in the bottom plate 18, bolts 116 secure the square hub 90 to the bottom plate 18. The ball bearing turntable 94 fits over the square hub 90 and includes a square top 120 and square bottom 122. The square bottom 122 fits into the bottom squared out recess 106 and is secured by bolts 124.

The top plate 16 includes a top plate center hole 126 with a top squared out recess 128 in the bottom of the top plate 16. The top plate 16 includes holes 130 about the top plate center hole 126 to receive bolts 124 that secure the top plate 16 to the square top 120 of the ball bearing turntable 94. The top plate center hole 126 fits over the square hub 90 and the top plate 16 is supported by the ball bearing turntable 94. The top plate 16 includes two concentric rings of semicircular shaped grooves 104 cut directly into the bottom of the top plate 16, which directly oppose the grooves 104 of the bottom plate 18 in order to receive the balls 92. When the top plate 16 is placed over the bottom plate 18, the grooves 104 of the top plate 16 align with the opposing grooves 104 of the bottom plate 18 and receive the balls 92. The top plate 16 includes a locking hole 62, whereby the second version utilizes the same rotation locking device 22 as the first version. The locking cap assembly 96 aids in securing the top plate 16 in position, as the bolts 116 to secure the top and bottom plates 16, 18 to the ball bearing turntable 94 are not a necessity, due to the top and bottom squared out recesses 128, 106 holding the ball bearing turntable 94 in place. The locking cap assembly 96 includes a cap 134, rubber washer 136 and steel washer 138. The cap 134 includes a cap center hole 140 which is recessed to receive the head 142 of the main bolt 98. The rubber washer 136 includes a round hole, while the steel washer 138 includes a square hole. First, the rubber washer 136 is placed over the square hub 90, then the steel washer 138 and finally the cap 134. The main bolt 98 screws into the square hub 90 to secure down the cap 134 and washers 136,138. The cap 134 includes a washer recess 144 in the bottom of the cap 134 to receive the steel washer 138. The square hole of the steel washer 138 is sized to just fit over the square hub 90 so that the steel washer 138 does not rotate. The top plate 16 also includes a flooring type surface 64 mounted onto the top plate 16 which is the same as the first version.

The second version offers the following advantages over the first version. The second version has a very low torsional resistance due to the use of plastic balls 92 located in opposing semicircular grooves 104 cut directly into the top and bottom plates 16, 18 of the platform 10. No races or cages are used to locate or separate the balls 92 in the grooves 104, allowing a greater number of balls 92 to be used and hence allowing the use of plastic balls verses steel balls for the device. The plastic balls 92 also produce less noise than steel balls, when rotating the top plate 16 about the bottom plate 18. This is important to the user, as the user generally does not want to draw attention to themselves at the work place due to unnecessary noise. The makeup of the second version allows for a lower height (less than inch) then the first version, as the top and bottom plate 16, 18 can be of a thinner aluminum. The lower height of second version allows easy egress and prevents the occupant from being raised a substantial amount from their ordinary working height while seated in a wheelchair. The lower height is achieved by cutting the grooves 104 directly into the top and bottom plates 16, 18. Low height is also achieved by using the two concentric rings of balls 92, allowing the top plate 16 to be much thinner due to the load sharing of the interior ring of balls 92. Also, due to the use of an interior ring of balls 92, the top plate 16 does not have to resist bending moment loads due to the wheelchair 12 and occupant weight. The second version is lightweight, allowing easy handling of the platform 10. Also, surface hardness of the aluminum is not sufficient to resist the point loads exerted by metal ball bearings, thereby causing indentations into the surface of the aluminum. However, the use of plastic balls 92 with their correspondingly lower stiffness does not adversely affect the surfaces of the plates 16, 18.

An additional feature of the second version is the easy adjustment of the rotational resistance. The rubber washer 136 is pressed against the top plate 16 by the steel washer 138 and cap 134 due to the bearing force of atop-mounted main bolt 98. The amount of pressure exerted by the rubber washer 136 on the top plate 16 is adjusted by loosening or tightening the main bolt 98. Therefore, the rotational resistance of the top plate 16 can be adjusted by tightening or loosening the main bolt 98. Whereby the tighter the main bolt 98, the more resistance or frictional force is applied by the rubber washer 136 and the harder it is to rotate the top plate 16.

All of the features of the first and second versions can be mix and matched to form the invention. FIGS. 14–25 show a third version with additional features, of which can also be incorporated into the first and second versions. Again, the main difference of the third version being the interaction between the top and bottom plates 16, 18, whereby these differences allow for a thinner and lightweight version. The additional features include a top plate electronic locking system 150 and a top plate motion system 152.

Figure 14:
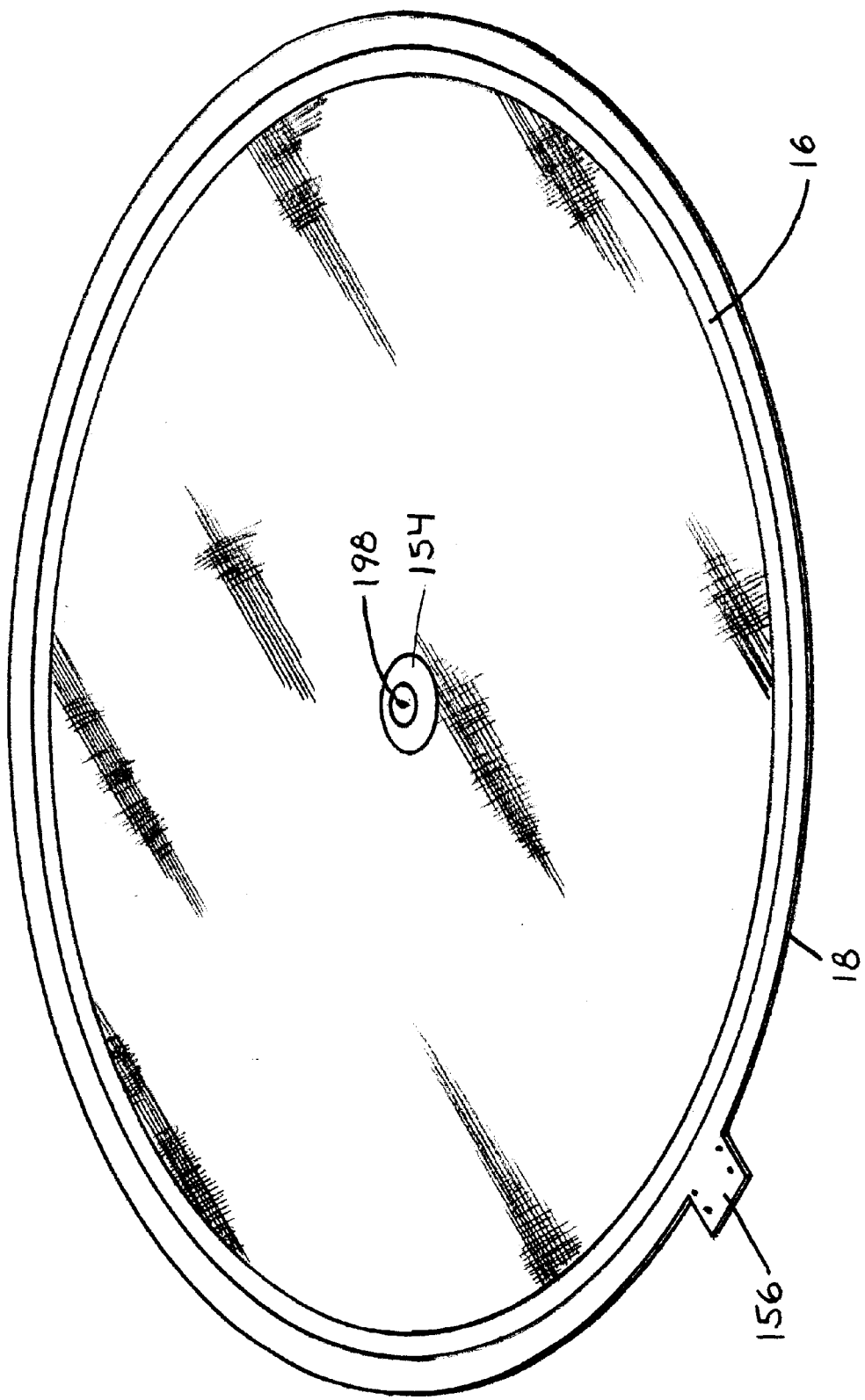
FIG. 14 is a perspective view of a third version of the wheelchair swivel platform according to the present invention.
Figure 15:
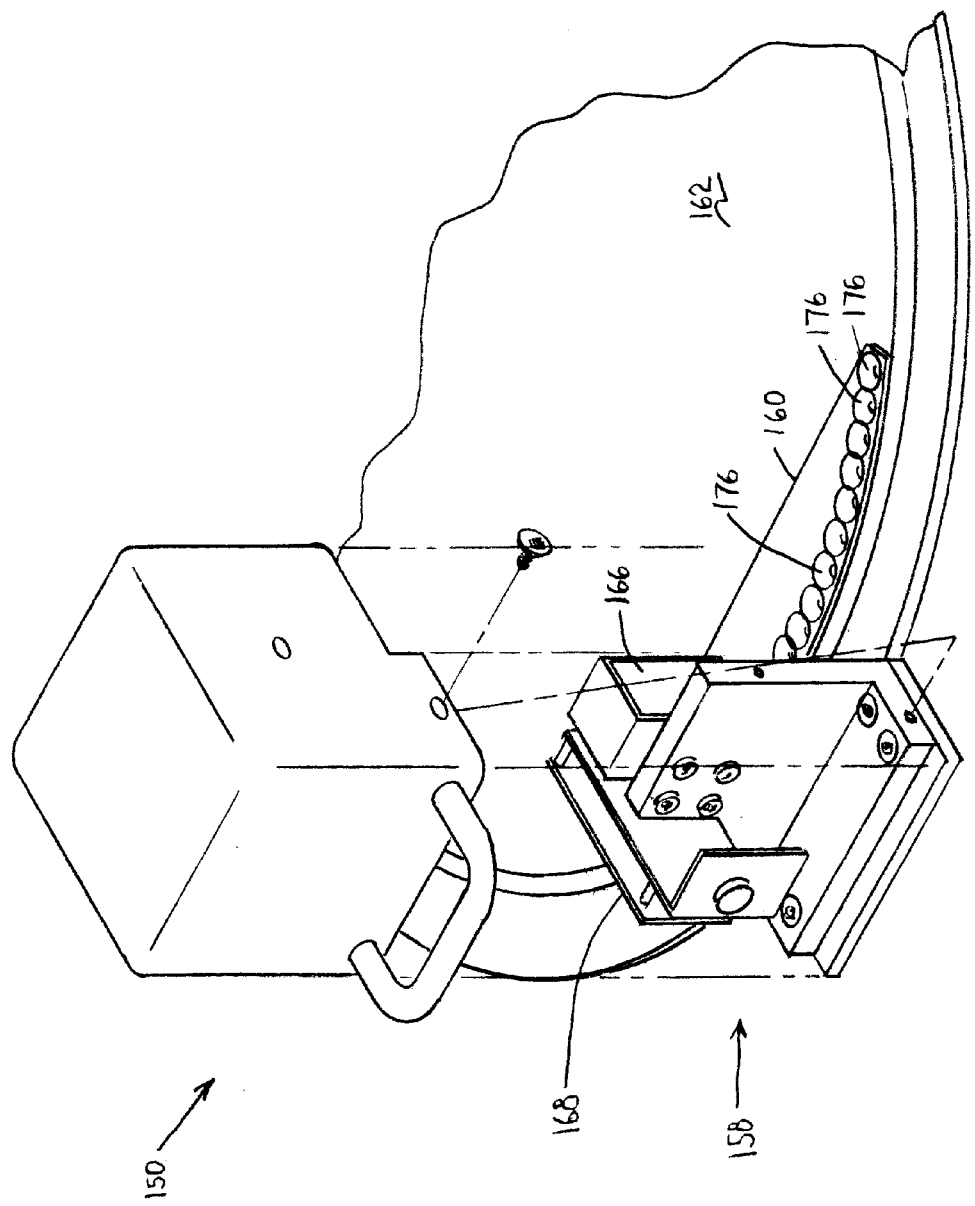
FIG. 15 is a perspective view of a top plate electronic locking system according to the present invention.
Figure 16:
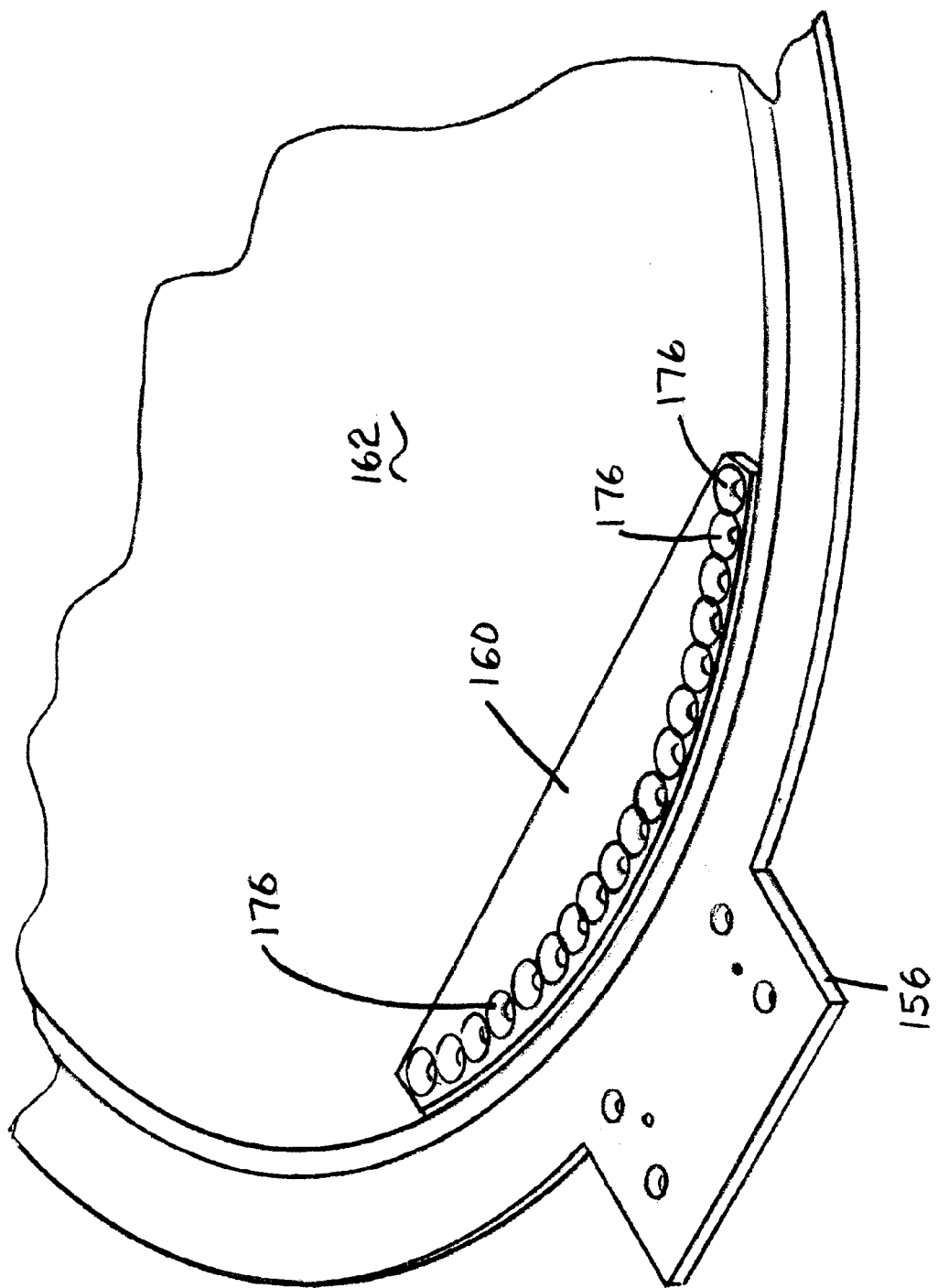
FIG. 16 is a perspective view of a locking plate according to the present invention.
Figure 17:
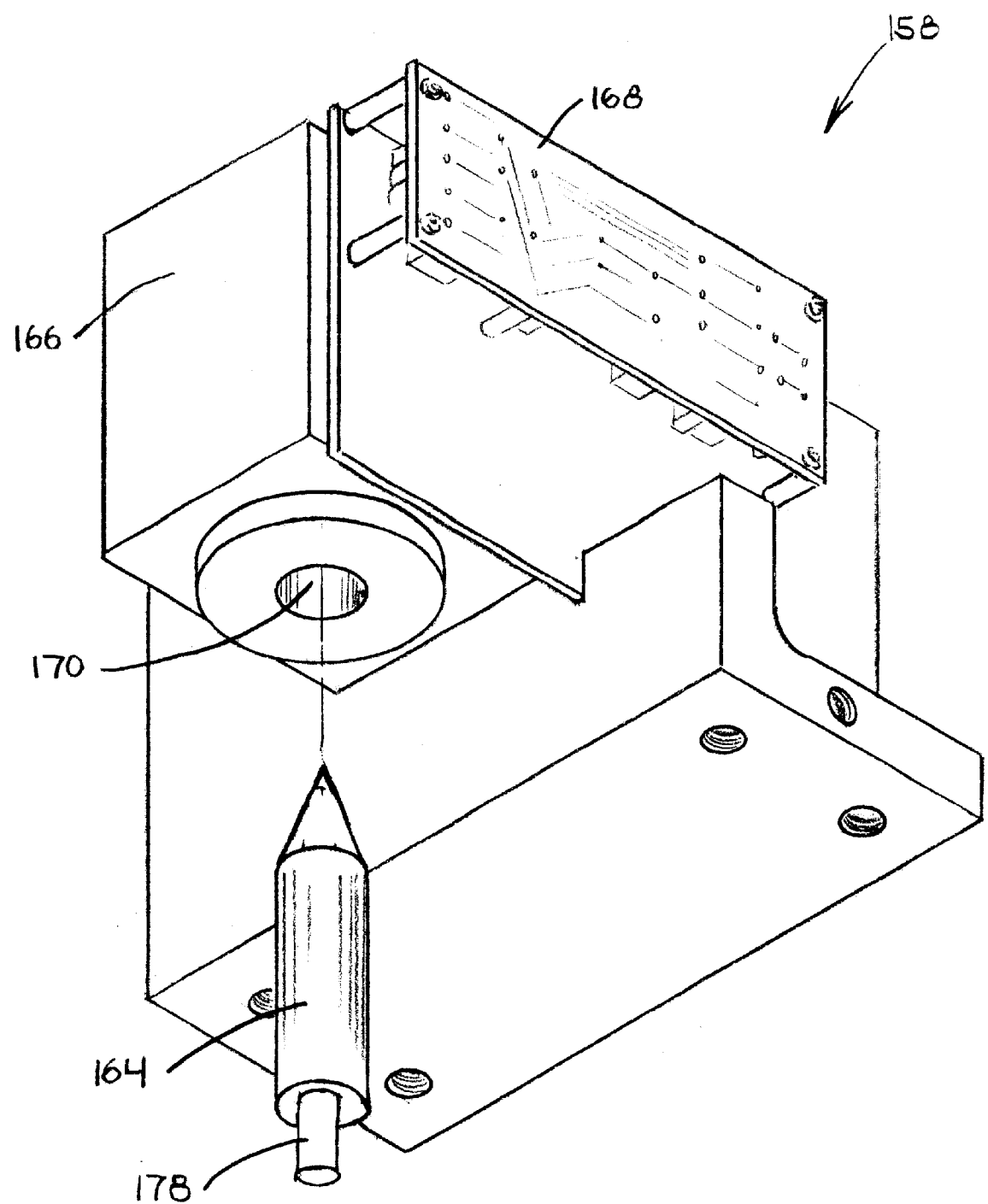
FIG. 17 is a perspective view of an electronic mechanism according to the present invention.

FIG. 14 shows the third version of the wheelchair swivel platform 10 as assembled. As in all versions, there is a top plate 16, bottom plate 18 and a center cap 154. Also shown is a mounting tab 156 extending from the bottom plate 18. The mounting tab 156 is for the mounting of the top plate electronic locking system 150 or the top plate motion system 152. FIGS. 15–17 show the top plate electronic locking system 150. The top plate electronic locking system 150 is for locking the top plate 16 in place, so that the top plate 16 does not rotate. The top plate electronic locking system 150 includes an electronic mechanism 158 attached to the mounting tab 156 and a lock down plate 160 attached to a top surface 162 of the top plate 16. The electronic mechanism 158 includes a plunger 164, solenoid 166 and electronics 168. The solenoid 166 holds the plunger 164 upward in the solenoid 166 until activated. The electronics 168 activate the solenoid 166, which releases the plunger 164 and allows the plunger 164 to fall from a plunger hole 170 in the solenoid 166, as shown in FIG. 17. The electronics 168 can be controlled by a direct line or remote control, a remote control 172 is shown with a control button 174. The lock down plate 160 includes a series of locking holes 176. To lock the top plate 16 in position, the top plate 16 is rotated, such that the lock down plate 160 is positioned under the plunger hole 170 of the electronic mechanism 158. The solenoid 166 is then activated and the plunger 164 is release, so that the plunger 164 falls into one of the locking holes 176. This allows the user to lock the top plate 16 in position, simply with the touch of the control button 174. To ease alignment of the locking holes 176 with the plunger hole 170, the locking holes 176 are spaced close together and conical in shape, while a tip 178 of the plunger 164 is tapered.

Figure 18:
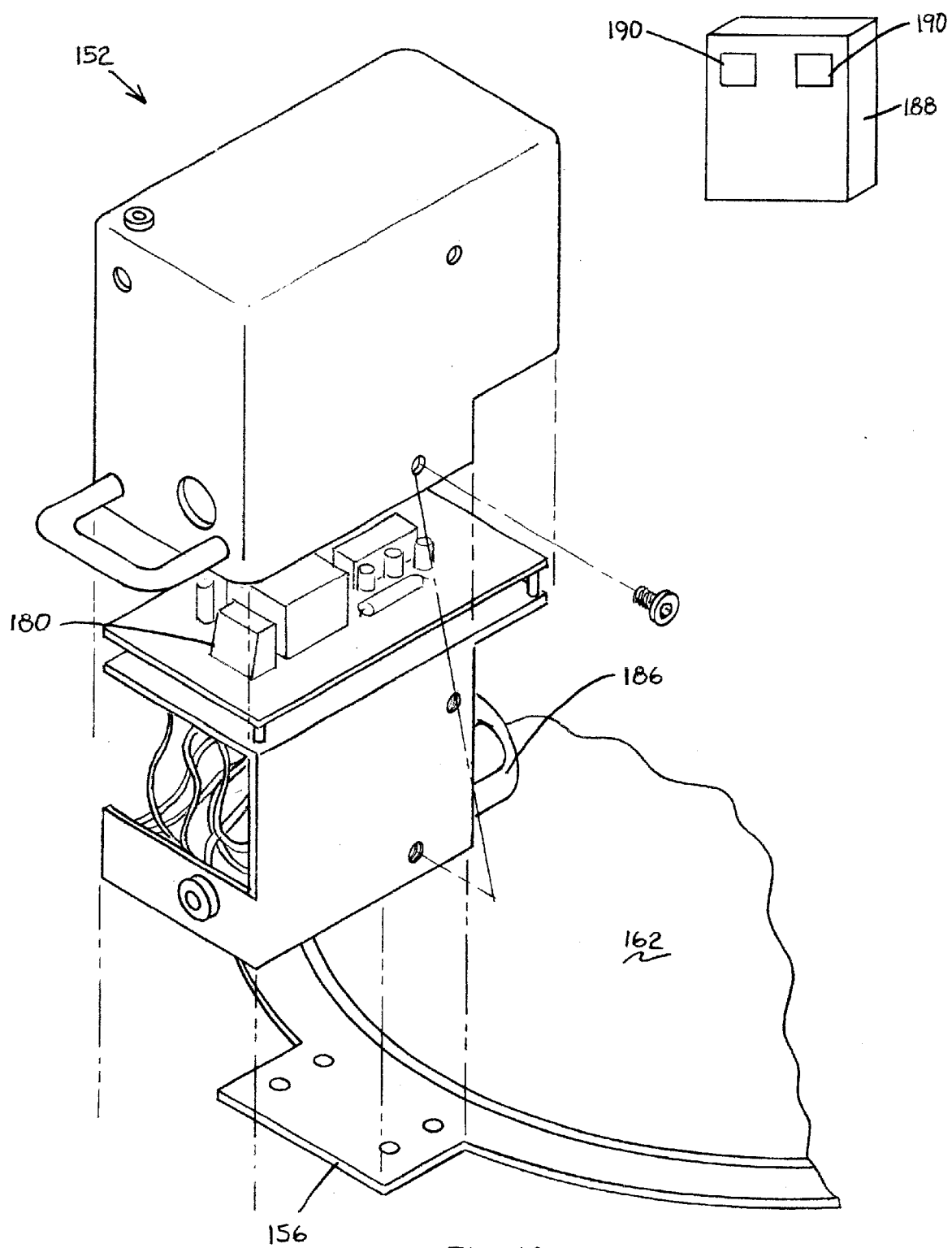
FIG. 18 is a perspective view of a top plate motion system according to the present invention.
Figure 19:
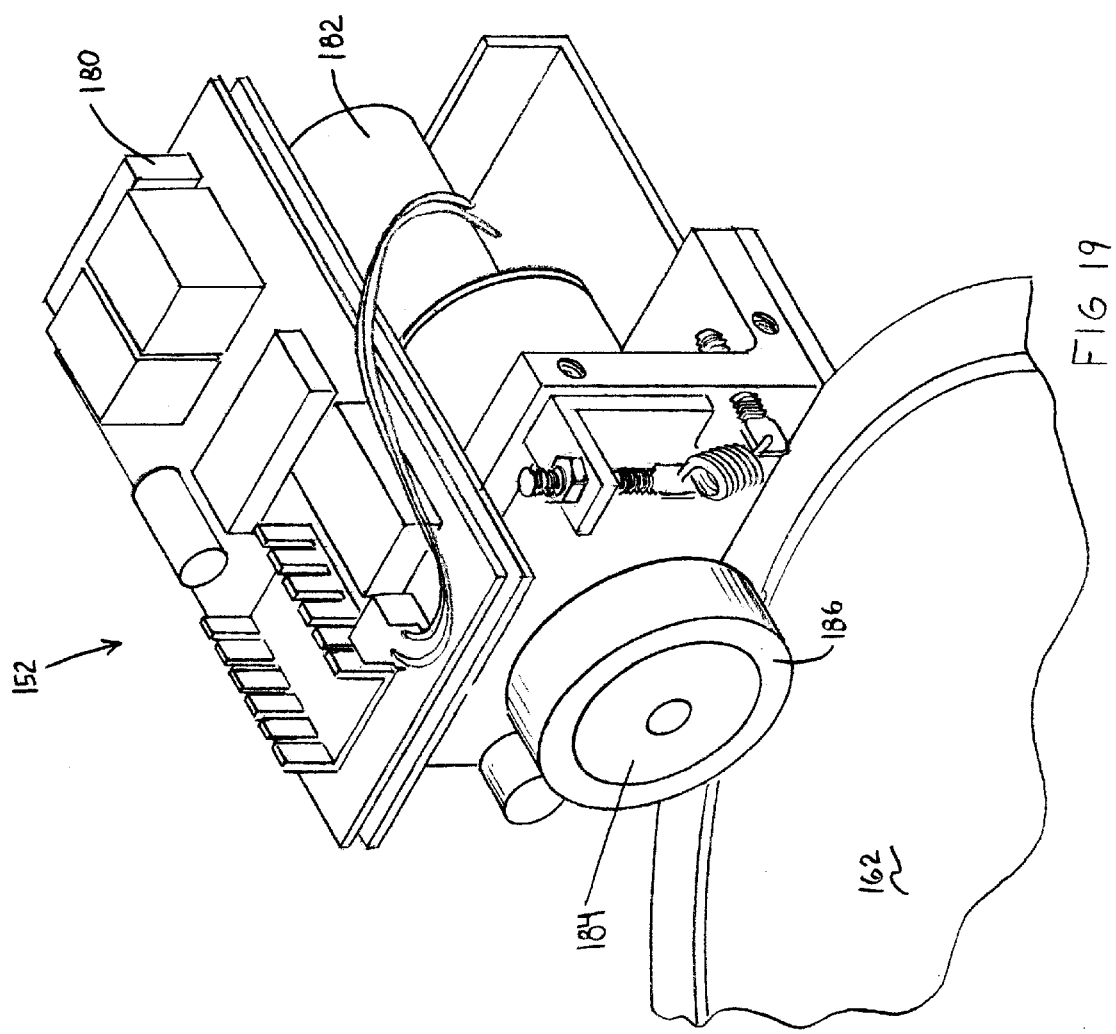
FIG. 19 is another perspective view of the top plate motion system according to the present invention.

The top plate motion system 152 attaches to the mounting tab 156 and replaces the top plate electronic locking system 150. The top plate motion system 152 includes electronics 180, a motor 182 and drive wheel 184, as shown in FIGS. 18–19. The drive wheel 184 includes a rubber tire 186. The electronics 180 activate the motor 182, which in turn rotates the drive wheel 184 in either a clockwise or counterclockwise direction. The electronics 180 can be controlled by a direct line or remote control, the remote control 188 is shown with control buttons 190. The top plate motion system 152 is positioned on the mounting tab 156, such that the rubber tire 186 directly contacts the top surface 162 of the top plate 16. When the rubber tire 186 is not rotating, the rubber tire 186 restricts the top plate 16 from rotating. When the rubber tire 186 is rotating, the top plate 16 is rotated until the rubber tire 186 stops. This allows the user to rotate the top plate 16 in either direction and lock the top plate 16 in position, simply with the touch of the control buttons 190.

Figure 20:
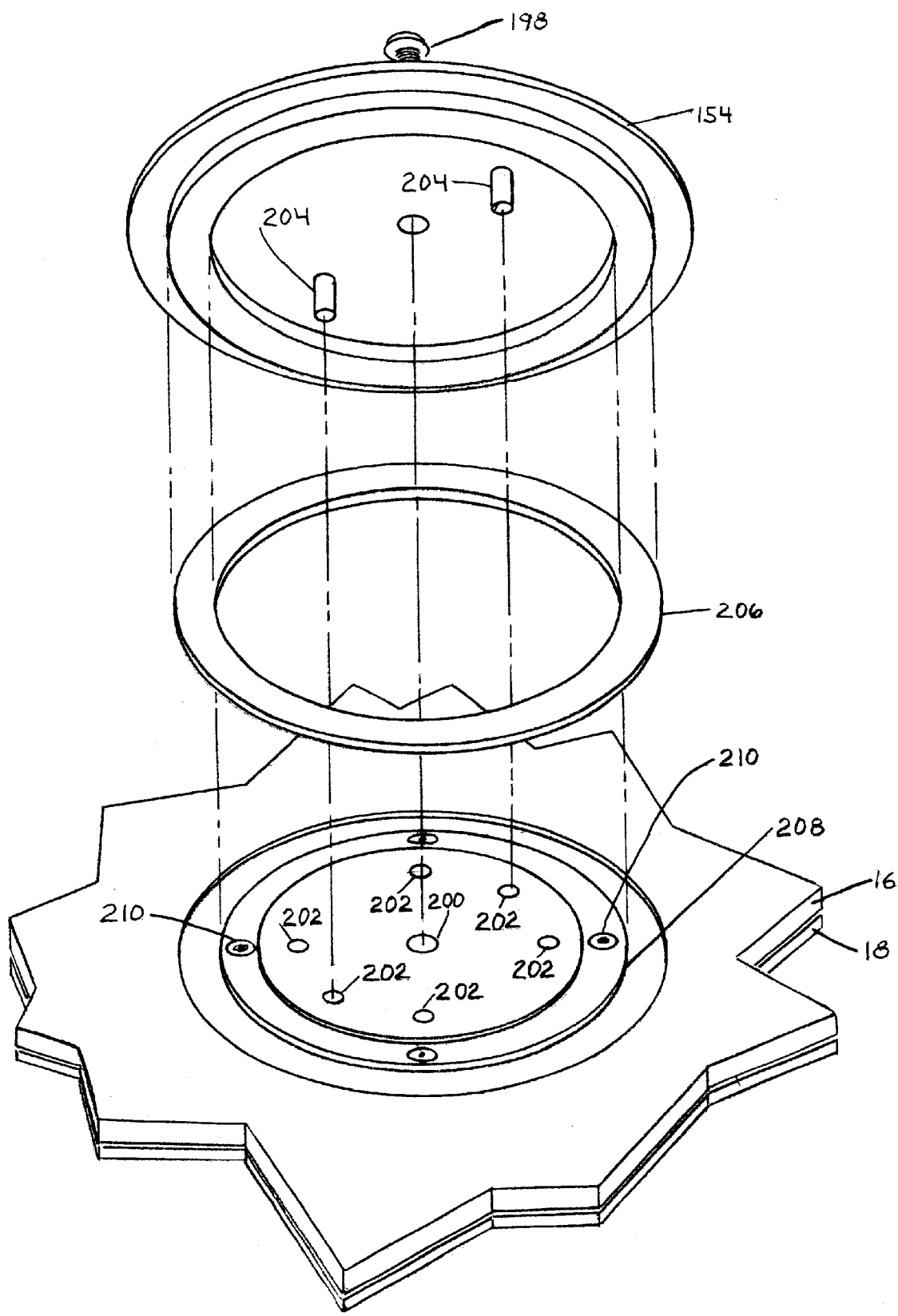
FIG. 20 is an exploded view of a center of the wheelchair swivel platform of FIG. 13 according to the present invention.
Figure 21:
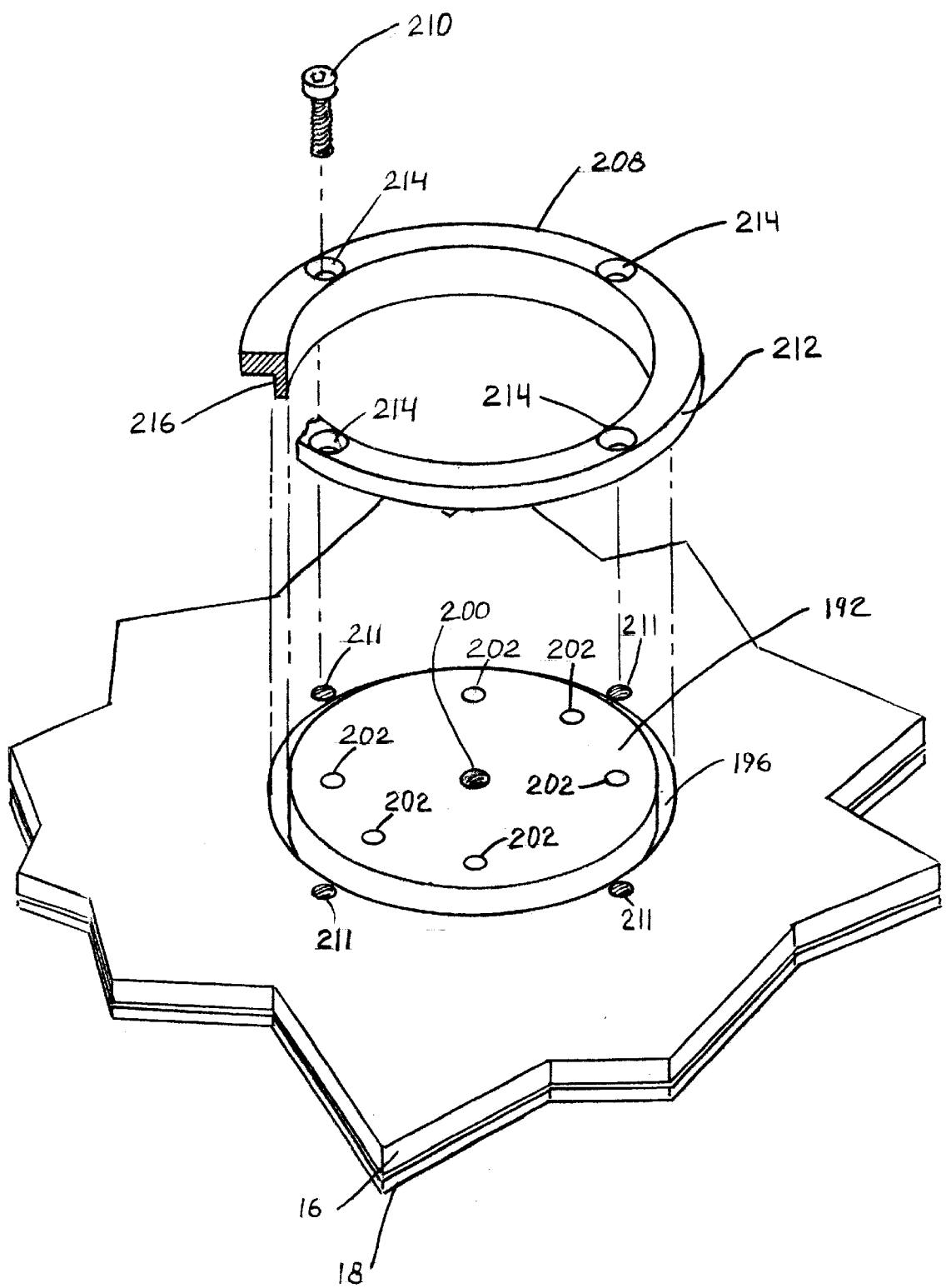
FIG. 21 is another exploded view of the center of the wheelchair swivel platform of FIG. 13 according to the present invention.
Figure 22:
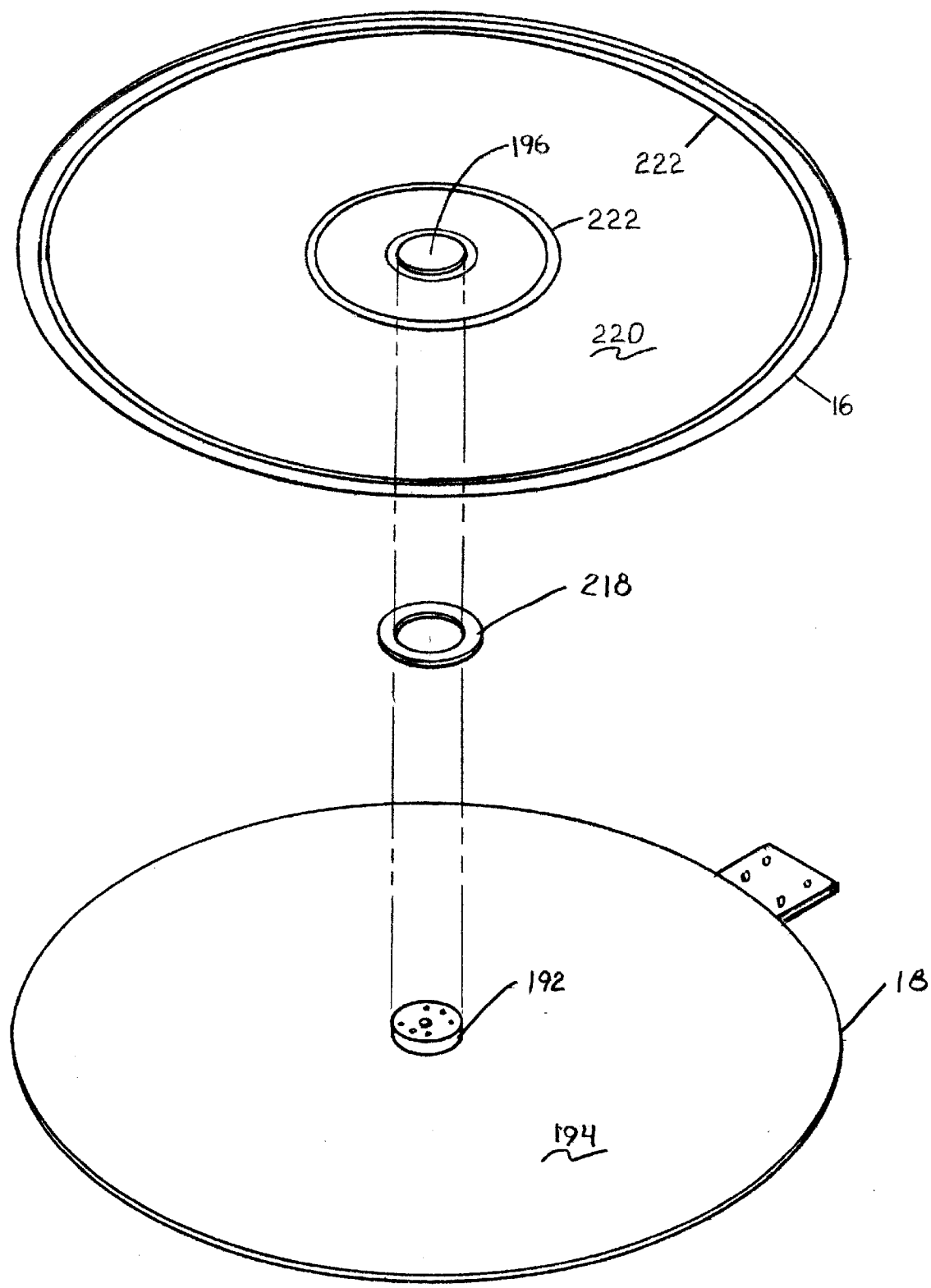
FIG. 22 is an exploded view of the wheelchair swivel platform of FIG. 13 according to the present invention.
Figure 23:
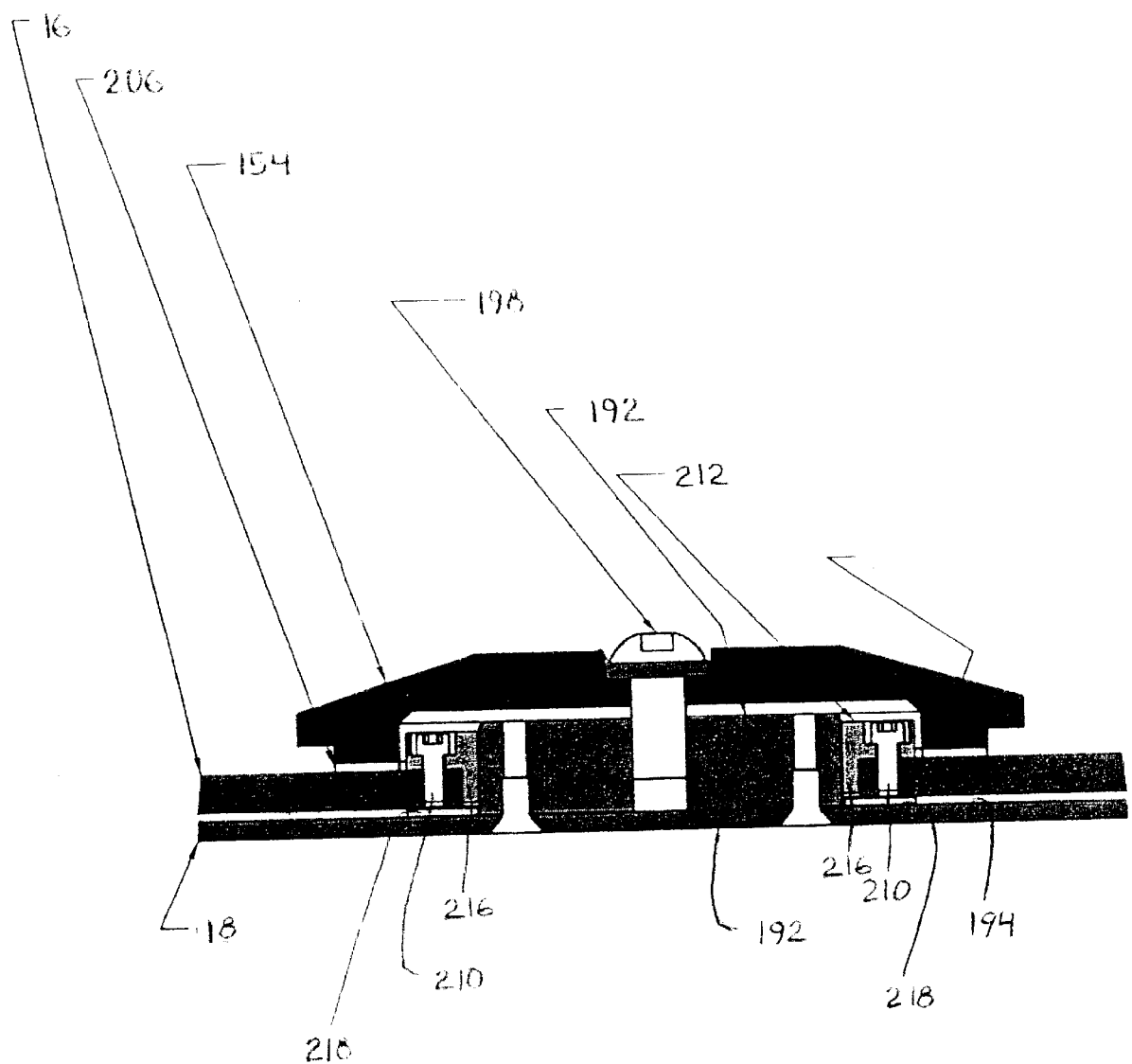
FIG. 23 is a cross-sectional view of the center of the wheelchair swivel platform of FIG. 13 according to the present invention.

FIGS. 20–25 show the top plate 16 and bottom plate 18 interaction according to the third version. FIGS. 22–23 show the bottom plate 18 with a center post 192 extending upward from the center of a top surface 194 of the bottom plate 18. The top surface 194 of the bottom plate 18 is smooth. The center post 192 extends into a center hole 196 of the top plate 16. FIGS. 20, 23 show the center cap 154 which is attached down with a screw 198 on top of the center post 192. The center post 192 includes a threaded screw hole 200 to receive the screw 198. The center post 192 includes pin holes 202 to receive locating pins 204 extending downward form the center cap 154. The interaction of the locating pins 204 and pin holes 202 prevents rotation of the center cap 154. FIGS. 20, 23 show a friction ring 206. The friction ring 206 is usually made of a fiber based material and provides friction between the center cap 154 and the top plate 16. The friction between the center cap 154 and the top plate 16 restricts the rotation speed of the top plate 16, whereby the tighter the center cap 154 is screwed to the center post 192, the more friction is created to restrict the rotation of the top plate 16.

FIGS. 20–21, 23 show a top plate bushing 208 attached with screws 210 about the center hole 196 of the top plate 16. The top plate bushing 208 is made of an oil impregnated nylon. The top plate bushing 208 includes a lip 212 for attachment to the top plate 16 using holes 214 in the lip 212. A main body 216 of the top plate bushing 208 encircles the center post 192 and extends into the center hole 196 of the top plate 16. Since the top plate bushing 208 is made of the oil impregnated nylon, the top plate bushing 208 provides a lubricated surface that rides against the center post 192. FIGS. 22–23 show a bearing washer 218 which encircles the center post 192 and is between the top surface 194 of the bottom plate 18 and a bottom surface 220 of the top plate 16. The bearing washer 218 is also made of an oil impregnated nylon. The bearing washer 218 supports and interacts with the top plate 16 and the bottom plate 18. Since the bearing washer 218 is made of the oil impregnated nylon, the bearing washer 218 allows the top plate 16 and bottom plate 18 to ride against the bearing washer 218 and provides lubricated support between the center of the top plate 16 and bottom plate 18.

Figure 24:
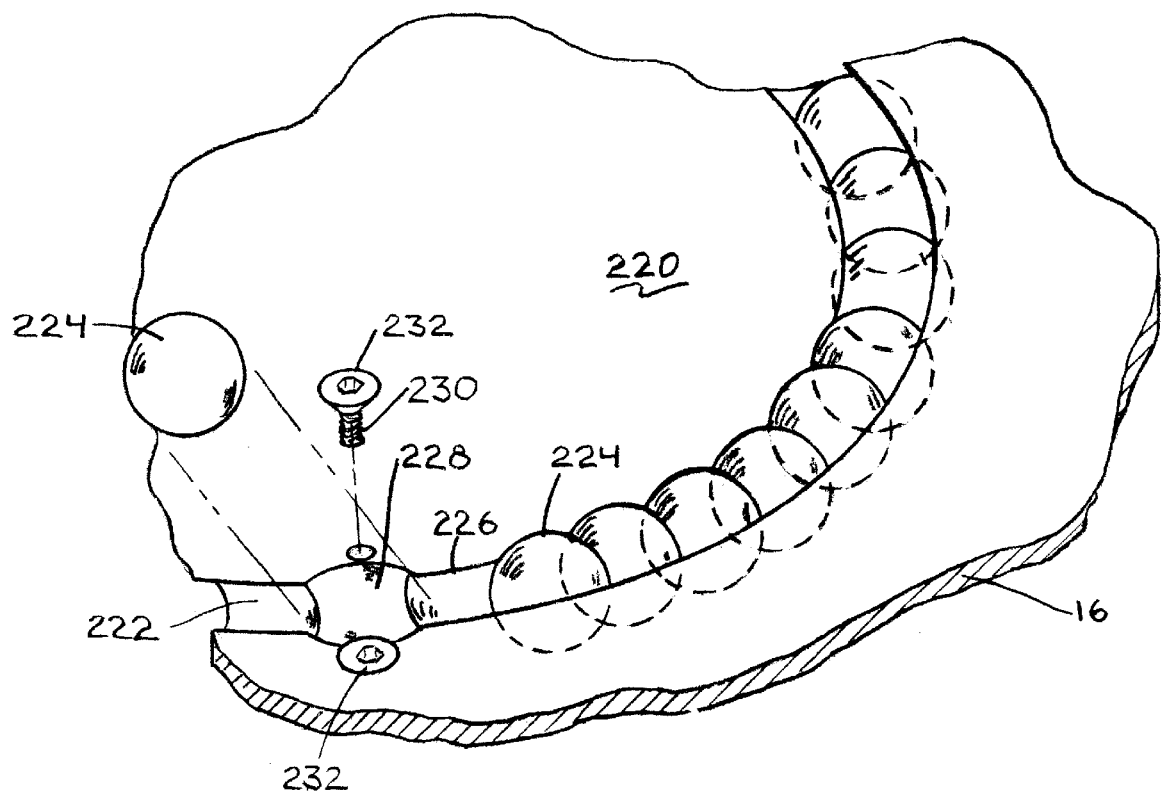
FIG. 24 is a partial perspective view of one of the grooves and bearings of the wheelchair swivel platform of FIG. 13 according to the present invention.
Figure 25:
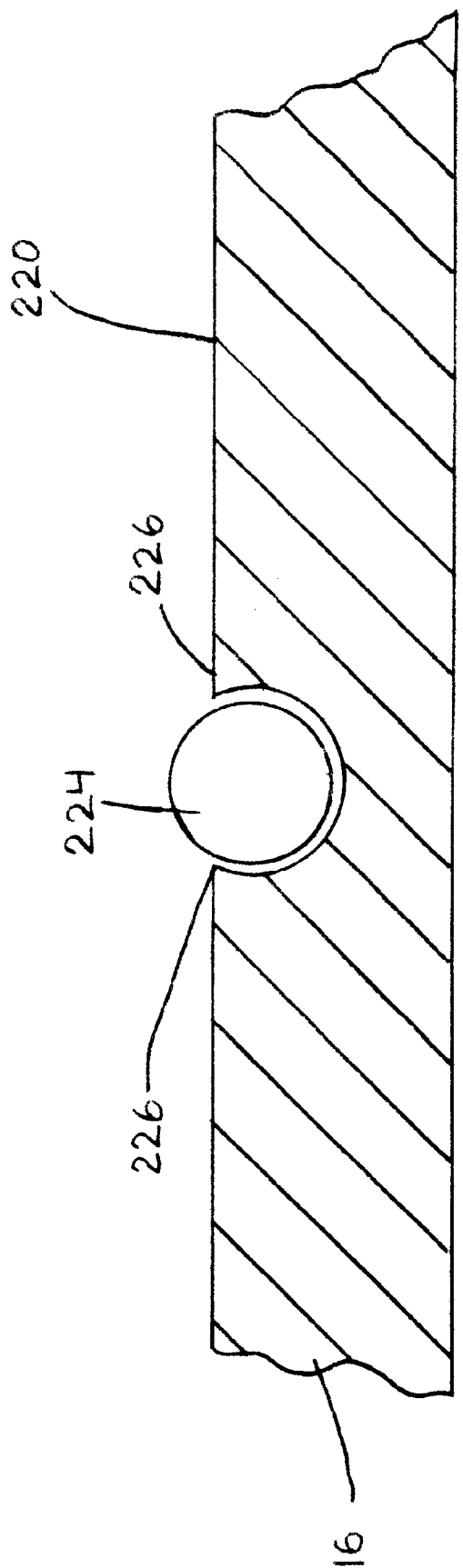
FIG. 25 is a cross-sectional view of one of the grooves of the wheelchair swivel platform of FIG. 13 according to the present invention.

FIG. 22 shows grooves 222 on the bottom surface 220 of the top plate 16. The grooves 222 include nylon ball bearings 224 extending outward from the grooves 222. FIGS. 24–25 shows an example of the nylon ball bearings 224 extending out of one of the grooves 222. The grooves 222 are machined such that only a portion of the ball bearings 224 are allowed extend outward from an open area of the grooves 222, due to curving sides 226. Thus, the ball bearings 224 are retained in the grooves 222 by curving sides 226 of the grooves 222. The ball bearings 224 are inserted into the grooves 222 by milling an insert slot 228 in each of the grooves 222, in which the insert slot 228 is larger than a ball bearings 224. Screws 230 are shown installed by the sides of the insert slot 228, once the ball bearings 224 are inserted. The heads 232 of the screws 230 retain the ball bearings 224 from falling from the insert slot 228, as part of the heads 232 extend into the insert slot 228 towards the ball bearings 224. The nylon ball bearings 224 provide moving support of the top plate 16 over the bottom plate 18, whereby the nylon ball bearings 224 roll over the smooth surface of the top surface 194 of the bottom plate 18.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A swivel platform comprising:
   a bottom plate acting as a base to support said platform from a surface such as a floor;
   a top plate rotatably attached to said bottom plate, said top plate including a center hole;
   said bottom plate including a center post extending upward from said bottom plate into said center hole, wherein said top plate rotates about said center post;
   at least one groove in a bottom surface of said top plate, said at least one groove encircling said center post; and
   said groove including ball bearings retained by said at least one groove, said at least one groove including curved sides; and
   said curved sides being curved to retain said ball bearings in said at least one groove without any other support and said curved sides being curved to retain said ball bearings such that only a portion of each of said ball bearings is allowed to extend outward and contact a top surface of said bottom plate.

2. The swivel platform of claim 1, wherein said bottom and top plate include a tapered edge which is strong enough to allow a wheelchair to roll onto said platform.

3. The swivel platform of claim 1, further including an oil impregnated nylon bushing between said center post and said center hole, said bushing providing a lubricated surface between said center post and said top plate.

4. The swivel platform of claim 3, further including an oil impregnated bearing washer positioned about said center post and between said top and bottom plates, said bearing washer providing a lubricated surface between said top and bottom plates.

5. The swivel platform of claim 1, further including an oil impregnated bearing positioned about said center post and between said top and bottom plates, said bearing washer providing a lubricated surface between said top and bottom plates.

6. The swivel platform of claim 1, further including a center cap attached to said center post over said top plate, said center cap retaining said top plate on said center post.

7. The swivel platform of claim 1, further including a friction ring positioned about laid center post and between said center cap and said top plate, said friction ring providing resistance to the rotation of said top plate.

8. The swivel platform of claim 1, further including an insert slot along said at least one groove to remove and receive said ball bearings in said at least one groove.

9. The swivel platform of claim 8, further including two screws each having a head and said screws attached to said bottom surface of said top plate near said insert slot such that said heads act to restrict removal of said ball bearings from said at least one groove while attached to said top plate.

* * * * *